US011190037B2

(12) United States Patent
Lee et al.

(10) Patent No.: US 11,190,037 B2
(45) Date of Patent: Nov. 30, 2021

(54) ELECTRONIC DEVICE AND METHOD FOR CHARGING BATTERY

(71) Applicant: Samsung Electronics Co., Ltd., Suwon-si (KR)

(72) Inventors: Seokwoo Lee, Suwon-si (KR); Hyunsuk Choi, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 163 days.

(21) Appl. No.: 16/723,373

(22) Filed: Dec. 20, 2019

(65) Prior Publication Data
US 2020/0203980 A1 Jun. 25, 2020

(30) Foreign Application Priority Data

Dec. 21, 2018 (KR) .......................... 10-2018-0166907

(51) Int. Cl.
H01M 10/44 (2006.01)
H01M 10/46 (2006.01)
H02J 7/00 (2006.01)
H04W 72/08 (2009.01)
H02J 50/12 (2016.01)
H02J 7/02 (2016.01)

(52) U.S. Cl.
CPC ...... *H02J 7/00714* (2020.01); *H02J 7/00032* (2020.01); *H02J 7/0047* (2013.01); *H02J 7/02* (2013.01); *H02J 50/12* (2016.02); *H04W 72/082* (2013.01)

(58) Field of Classification Search
CPC .. H02J 7/00714; H02J 7/00036; H02J 7/0047; H02J 7/00032; H02J 7/02; H02J 7/007188; H04W 72/082

USPC ....... 320/106, 107, 114, 128, 132, 134, 136, 320/162, 163, 164
See application file for complete search history.

(56) References Cited

U.S. PATENT DOCUMENTS 8,280,439 B2 * 10/2012 Pattenden ........... H02J 7/00036
320/106
8,929,957 B2 1/2015 Toncich et al.
(Continued)

FOREIGN PATENT DOCUMENTS

CN 104539004 B 7/2017
CN 108270298 A 7/2018
(Continued)

OTHER PUBLICATIONS

International Search Report dated Apr. 21, 2020, issued in International Application No. PCT/KR2019/018245.
(Continued)

*Primary Examiner* — Edward Tso
(74) *Attorney, Agent, or Firm* — Jefferson IP Law, LLP

(57) ABSTRACT

An electronic device is provided. The electronic device includes a battery, at least one transceiver, and at least one processor configured to be operatively coupled with the at least one transceiver. The at least one processor is configured to detect a charging event for the battery, to determine difference value between first communication quality before detection of the charging event and second communication quality after detection of the charging event, to determine a charge current, based on the difference value, and to charge the battery according to the determined charge current value.

19 Claims, 12 Drawing Sheets

(56) References Cited

U.S. PATENT DOCUMENTS

| | | |
|---|---|---|
| 9,887,594 B2 | 2/2018 | Kim et al. |
| 2005/0040790 A1 | 2/2005 | Ito et al. |

FOREIGN PATENT DOCUMENTS

| | | |
|---|---|---|
| JP | 2014-179746 A | 9/2014 |
| KR | 10-2008-0045010 A | 5/2008 |
| KR | 10-0833108 B1 | 5/2008 |

OTHER PUBLICATIONS

Part 11: Wireless LAN Medium Access Control (MAC) and Physical Layer (PHY) specifications: Higher-Speed Physical Layer Extension in the 2.4 GHz Band, IEEE Std 802.11b-1999, (Supplement to ANSI/IEEE Std 802.11, 1999 Edition), Sep. 16, 1999.

Part 11: Wireless LAN Medium Access Control (MAC) and Physical Layer (PHY) Specifications, Amendment 5: Enhancements for Higher Throughput, IEEE Std 802.11 n-2009, Sep. 11, 2009.

Part 11: Wireless LAN Medium Access Control (MAC) and Physical Layer (PHY) Specifications☐, Amendment 6: Enhancements for High Efficiency WLAN, IEEE P802.11ax/D2.2, Feb. 2018.

Part 11: Wireless LAN Medium Access Control (MAC) and Physical Layer (PHY) specifications: High-speed Physical Layer in the 5 GHZ Band, IEEE Std 802.11a-1999 (Supplement to IEEE Std 802.11-1999), Sep. 16, 1999.

\* cited by examiner

: 
ELECTRONIC DEVICE AND METHOD FOR CHARGING BATTERY

CROSS-REFERENCE TO RELATED APPLICATION(S)

This application is based on and claims priority under 35 U.S.C. § 119(a) of a Korean patent application number 10-2018-0166907, filed on Dec. 21, 2018, in the Korean Intellectual Property Office, the disclosure of which is incorporated by reference herein in its entirety.

BACKGROUND

1. Field

The disclosure relates to an electronic device for charging a battery and a method for operating the electronic device.

2. Description of Related Art

A user can use an electronic device for a long time by using a battery of the electronic device. The larger the charge current value provided to the battery, the faster the battery can be charged.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for providing fast charging while considering an interference signal.

Large charge current values provide fast charging of the battery while acting as a large interference signal to other circuits. Since this may cause deterioration in communication performance of the electronic device, a method for providing fast charging while considering an interference signal may be required.

The technical subjects pursued in the disclosure may not be limited to the above mentioned technical subjects, and other technical subjects which are not mentioned may be clearly understood, through the following descriptions, by those skilled in the art of the disclosure.

Additional aspects will be set forth in part in the description which follows and, in part, will be apparent from the description, or may be learned by practice of the presented embodiments.

In accordance with an aspect of the disclosure, an electronic device is provided. The electronic device includes a battery, at least one transceiver, and at least one processor configured to be operatively coupled with the at least one transceiver, wherein the at least one processor may be configured to detect a charging event for the battery, to determine a difference value between a first communication quality before detection of the charging event and a second communication quality after detection of the charging event, to determine a charge current value, based on the difference value, and to charge the battery according to the determined charge current value.

In accordance with another aspect of the disclosure, a method for operating an electronic device is provided. The method for operating an electronic device includes an operation of detecting a charging event for a battery of the electronic device, an operation of determining a difference value between a first communication quality before detection of the charging event and a second communication quality after detection of the charging event, and an operation of determining a charge current value, based on the difference value, and an operation of charging the battery according to the determined charge current value.

In accordance with another aspect of the disclosure, an electronic device is provided. The electronic device includes a battery, at least one transceiver, and at least one processor configured to be operatively coupled with the at least one transceiver, wherein the at least one processor may be configured to determine a range of a received signal strength of each of a plurality of fields by measuring a degree to which a communication quality decreases depending on a change in the received signal strength, to determine a first received signal strength value while the battery is charged, to identify a field corresponding to the first received signal strength value among the plurality of fields, to identify a charge current value corresponding to the identified field from a plurality of charge current values, and to charge the battery according to the identified charge current value, and wherein each of the plurality of fields may correspond to each of the plurality of charge current values.

In accordance with another aspect of the disclosure, a method for operating an electronic device is provided. The method for operating an electronic device includes an operation of determining a range of a received signal strength of each of a plurality of fields by measuring a degree to which a communication quality decreases depending on a change in the received signal strength, to determine a first received signal strength value while the battery is charged, an operation of identifying a field corresponding to the first received signal strength value among the plurality of fields, an operation of identifying a charge current value corresponding to the identified field from a plurality of charge current values, and an operation of charging the battery according to the identified charge current value, wherein each of the plurality of fields may correspond to each of the plurality of charge current values.

An electronic device and an operating method thereof according to various embodiments can enhance charging efficiency by adaptively determining a charge current.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
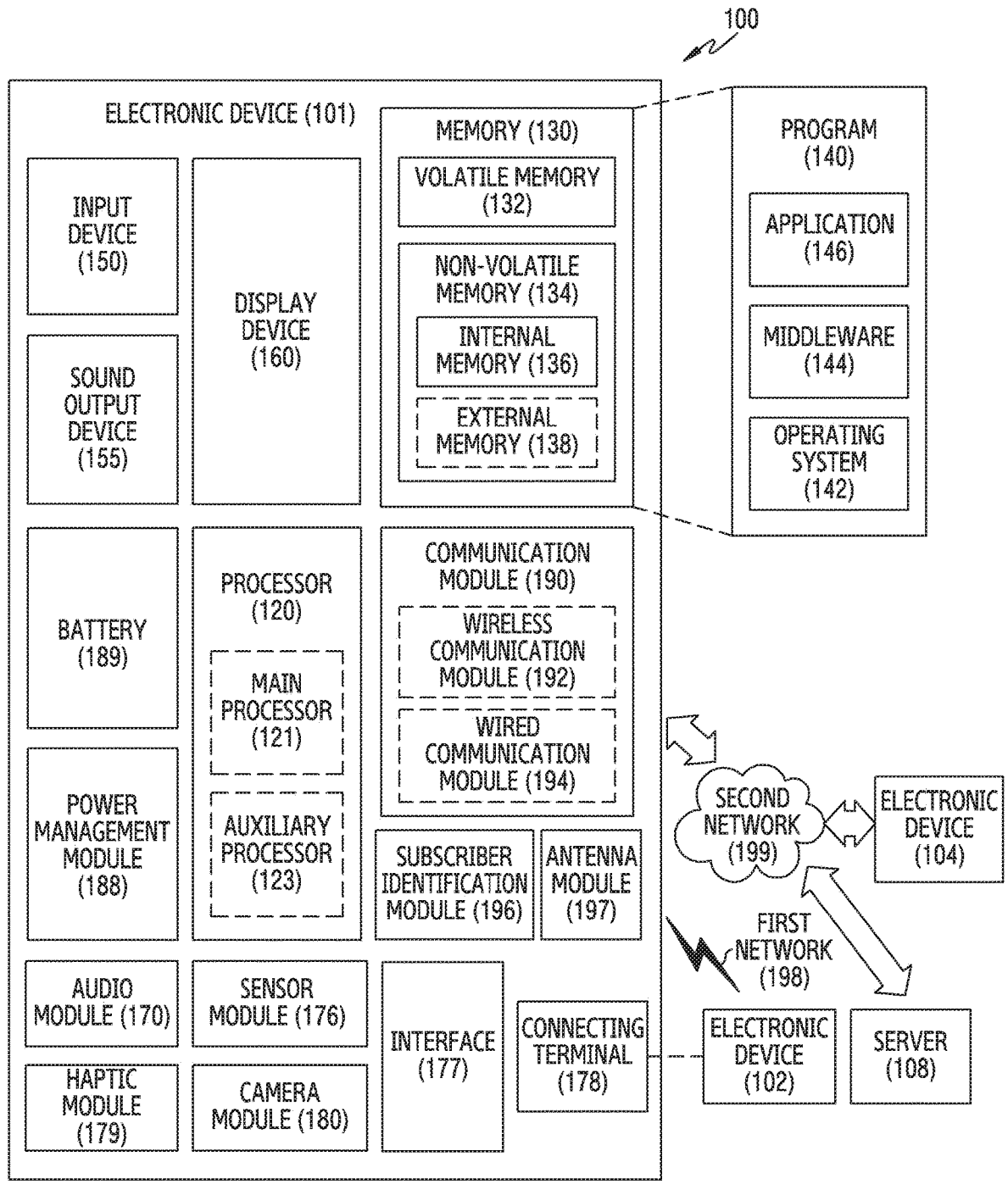
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment of the disclosure, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include an antenna including a radiating element composed of a conductive material or a conductive pattern formed in or on a substrate (e.g., PCB). According to an embodiment of the disclosure, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
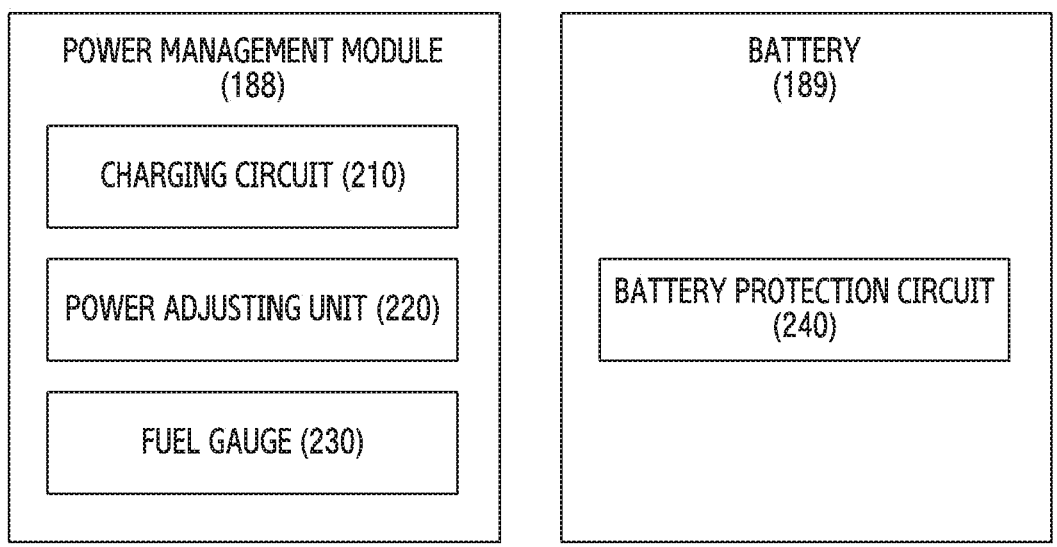
FIG. 2 is a block diagram of a power management module and a battery according to an embodiment of the disclosure.

FIG. 2 is a block diagram illustrating a power management module and a battery according to an embodiment of the disclosure.

Referring to FIG. 2, the power management module 188 may include charging circuitry 210, a power adjuster 220, or a power gauge 230. The charging circuitry 210 may charge the battery 189 by using power supplied from an external power source outside the electronic device 101. According to an embodiment of the disclosure, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment of the disclosure, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment of the disclosure, at least some of the functions of the power management module 188 may be performed by an external control device (e.g., the processor 120).

The battery 189, according to an embodiment of the disclosure, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment of the disclosure, at least part of the charging state information or use state information regarding the battery 189 may be measured using a corresponding sensor (e.g., a temperature sensor) of the sensor module 176, the power gauge 230, or the power management module 188. According to an embodiment of the disclosure, the corresponding sensor (e.g., a temperature sensor) of the sensor module 176 may be included as part of the PCM 240, or may be disposed near the battery 189 as a separate device.

Figure 3:
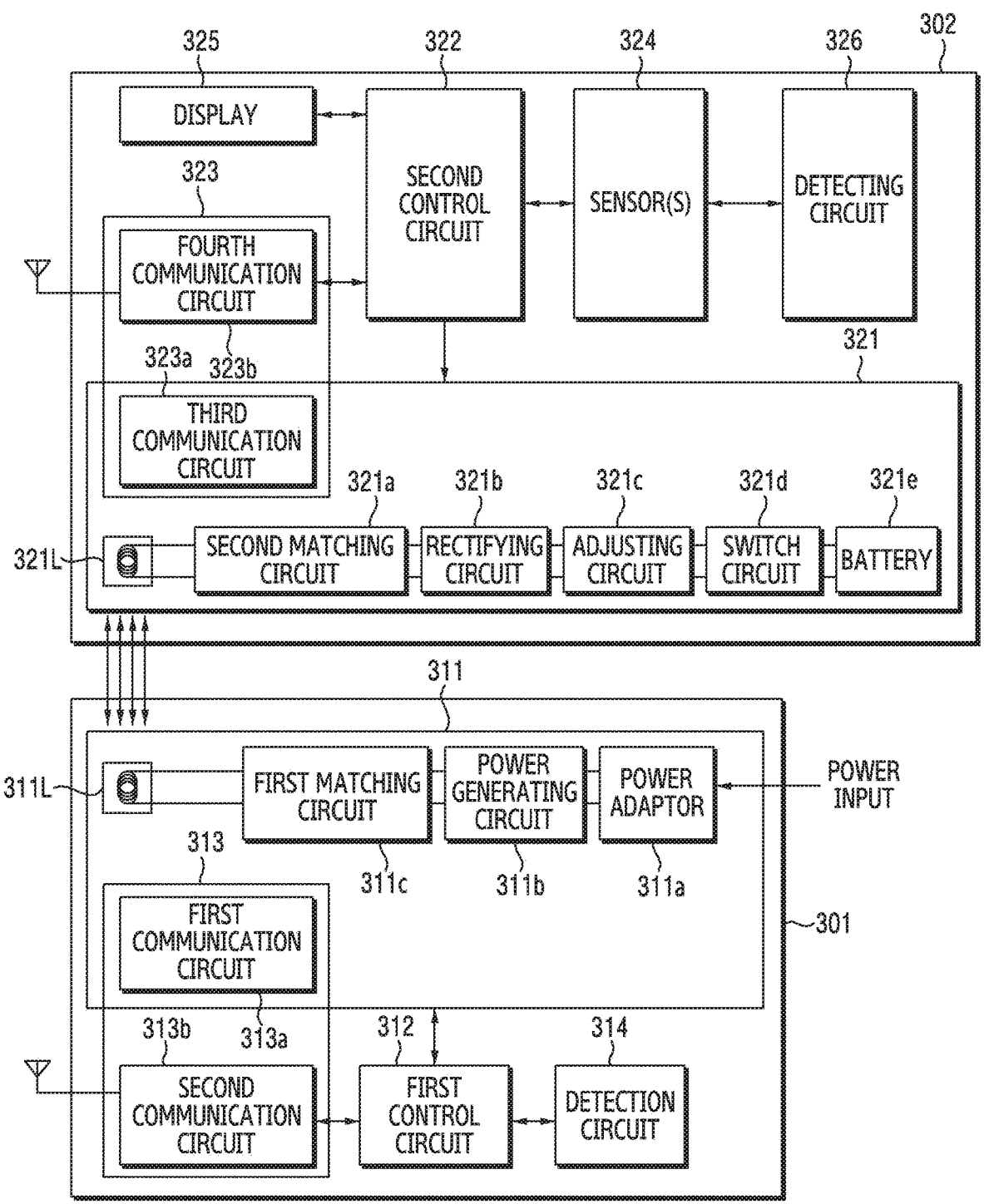
FIG. 3 is a view illustrating a wireless charging environment according to an embodiment of the disclosure.

FIG. 3 is a view illustrating a wireless charging environment according to an embodiment of the disclosure.

Referring to FIG. 3, a power transmitting device 301 (e.g., electronic device 101 of FIG. 1) (hereinafter, also referred to as "power transmitting device") according to various embodiments may wirelessly supply power to an external electronic device 302 (e.g., electronic device 102 of FIG. 1) (hereinafter, also referred to as "power receiving device"), and the external electronic device 302 may wirelessly receive power. The power transmitting device 301 may be an electronic device operating in a power transmitting mode. The external electronic device 302 may be an electronic device operating in a power receiving mode.

According to various embodiments, the power transmitting device 301 may include a power transmitting circuit 311, a first control circuit 312, a communication circuit 313, or a detection circuit 314.

According to various embodiments, the power transmitting circuit 311 may include a power adapter 311*a* that receives a power source (or power) from outside and coverts a voltage of an input power source appropriately, a power generating circuit 311*b* for generating power, or a first matching circuit 311*c* for maximizing efficiency between a transmitting coil 311L and a receiving coil 321L.

According to various embodiments, the power transmitting circuit 311 may include at least some of the power adapter 311a, the power generating circuit 311b, the transmitting coil 311L or the first matching circuit 311c to enable power transmission to a plurality of power receiving devices (e.g., first external electronic device and second external electronic device) in plural numbers.

According to various embodiments, the power transmitting circuit 311 may supply a battery power source or an external power source supplied to the power adapter 311a to the power generating circuit 311b using the power adapter 311. According to various embodiments, the battery power source may be a signal for acquiring power input from a battery (not shown) of the power transmitting device 301 to the power adapter 311a. According to various embodiments, the external power source may be a signal for acquiring power input from other electronic devices (not shown, e.g., travel adapter, power supply) to the power adapter 311a.

According to various embodiments, the power transmitting circuit 311 may generate a signal for supplying power to the external electronic device 302 using the power generating circuit 311b, and the signal may be transferred to the transmitting coil 311L.

According to various embodiments, the power transmitting circuit 311 may generate a first signal of a first frequency for providing first power to a first external electronic device and a second signal of a second frequency for providing second power to a second external electronic device using the power generating circuit 311b. The first signal of the first frequency and the second signal of the second frequency may be generated when the power transmitting coil 311L has a multi-coil structure.

According to various embodiments, the first control circuit 312 may perform overall control of the power transmitting device 301, and generate various types of messages necessary for wireless power transmission to transmit to the communication circuit 313. In an embodiment of the disclosure, the first control circuit 312 may calculate power (or amount of power) to be transmitted to the external electronic device 302, based on the information received from the communication circuit 313. In an embodiment of the disclosure, the first control circuit 312 may control the power transmitting circuit 311 such that the power generated by the transmitting coil 311L is transmitted to the external electronic device 302.

According to various embodiments, when transmitting power to each of a plurality of power receiving devices (e.g., first external electronic device and second external electronic device), respectively, the first control circuit 312 may control the power generating circuit 311b to generate a first signal of a first frequency for providing first power to the first external device and a second signal of a second frequency for providing second power to the second external device. To this end, the transmitting coil 311L may have a multi-coil structure.

According to various embodiments, the communication circuit 313 may include at least one of a first communication circuit 313a or a second communication circuit 313b. The first communication circuit 313a may, for example, communicate with a third communication circuit 323a of the external electronic device 302 using a frequency that is the same as or adjacent to the frequency used in the transmitting coil 311L for power transmission.

The first communication circuit 313a may communicate with the third communication circuit 323a using the transmitting coil 311L. The data (or communication signal) generated by the first communication circuit 313a may be transmitted using the transmitting coil 311L. The first communication circuit 313a may transfer data to the external electronic device 302 using a frequency shift keying (FSK) modulation technique. According to various embodiments, the first communication circuit 313a may communicate with a third communication circuit 323a of the power receiving device 302 by allowing the frequency of a power signal transferred through the transmitting coil 311L to be changed. Alternatively, the first communication circuit 313a may communicate with the third communication circuit 323a of the external electronic device 302 by allowing the power signal generated in the power generating circuit 311b to include data or a communication circuit. For example, the first communication circuit 313a may represent data by increasing or decreasing the frequency of the power transmission signal.

The second communication circuit 313b may, for example, communicate with a fourth communication circuit 323b of the external electronic device 302 using a frequency different from the frequency used for power transmission in the transmitting coil 311L (e.g., outband scheme). For example, the second communication circuit 313b may acquire information (e.g., voltage value after rectifier, rectified voltage value (e.g., $V_{rec}$), information, current value information flowing in a coil or a rectifying circuit (e.g., $I_{out}$), various types of packet, message, etc.) related to a charge state from the fourth communication circuit 323b using any one of various short range communication scheme, such as Bluetooth, Bluetooth low energy (BLE), Wi-Fi, or near field communication (NFC).

According to various embodiments, the external electronic device 302 (e.g., 101 of FIG. 1) may include a power receiving circuit 321 (e.g., power management module 188), a second control circuit 322 (e.g., processor 120), a communication circuit 323 (e.g., communication module 190), at least one sensor 324 (e.g., sensor module 176), a display 325 (e.g., display device 160), or a detecting circuit 326. In the external electronic device 302, a description about the configuration corresponding to the power transmitting device 301 may be partially omitted.

According to various embodiments, the external electronic device 302 may include a receiving coil 321L for wirelessly receiving power from the power transmitting device 301, a second matching circuit 321a, a rectifying circuit 321b for rectifying the received AC power into DC power, an adjusting circuit 321c for adjusting a charge current, a switch circuit 321d, or a battery 321e (e.g., battery 189).

According to various embodiments, the second control circuit 322 may perform overall control for the external electronic device 302, and generate various types of messages necessary for wireless power transmission to transfer to the communication circuit 323.

According to various embodiments, the communication circuit 323 may include at least one of the third communication circuit 323a or the fourth communication circuit 323b. The third communication circuit 323a may communicate with the power transmitting device 301 through the receiving coil 321L.

The third communication circuit 323a may communicate with the first communication circuit 313a using the receiving coil 321L. The data (or communication signal) generated by the third communication circuit 323a may be transmitted using the receiving coil 321L. The third communication circuit 323a may transfer data to the power transmitting device 301 using an amplitude shift keying (ASK) modulation technique. The fourth communication circuit 323b may communicate with the power transmitting device 301 using any one of various short-range communication schemes, such as Bluetooth, BLE, Wi-Fi, or NFC.

According to various embodiments, the at least one sensor 324 may include at least some of a current/voltage sensor, a temperature sensor, an illumination sensor, or a sound sensor.

According to various embodiments, the display 325 may display various types of display information required for wireless power transmission and reception.

According to various embodiments, the detecting circuit 326 may detect a searching signal or power received from the power transmitting device 301 to detect the power transmitting device 301. The detecting circuit 326 may detect a signal change of an input/output terminal of the receiving coil 321L, or the second matching circuit 321a, or the rectifying circuit 321b, caused by the receiving coil 321L signal generated by a signal outputted from the power transmitting device 301. According to various embodiments, the detecting circuit 326 may be included in the receiving circuit 321.

Most electronic devices (e.g., mobile terminals, tablet PCs, laptops) have a battery therein. Since general users can use the electronic device for a long time by charging the battery, a method of charging the battery faster is required. Among the techniques to speed up charging, there is a method of supplying a high current to the battery from a charger integrated chip (IC). When the battery is provided with a high charge current, the charge current may act as an interference signal to an antenna unit via various paths (harmonic components due to switching component operation of a charger IC, noise signal radiation from battery connector unit). Such an interference signal may cause a user to cause a communication failure at a time of voice call or data communication during charging of the electronic device.

The user may inevitably feel the deterioration of communication performance due to the charge current generated during charging of the electronic device. As a solution to this problem, a method of reducing the charge current outputted from the charger IC itself may be considered. When the charge current provided to the battery is reduced, the absolute amount of charging noise felt by the communication signal during charging is reduced, thereby reducing the deterioration of communication performance. However, the method of simply reducing the charge current has a disadvantage in that the charge time is extended by lowering the charge current even in a situation where communication performance is not deteriorated.

Various embodiments may not only ensure a certain level of communication performance but also provide a reduction in charging time by adaptively adjusting the charge current according to various situations, such as communication status, communication situation, channel status, and field change, etc., not just lowering the charge current provided to the battery. Various embodiments provide a method for optimizing communication performance and charging time.

Figure 4:
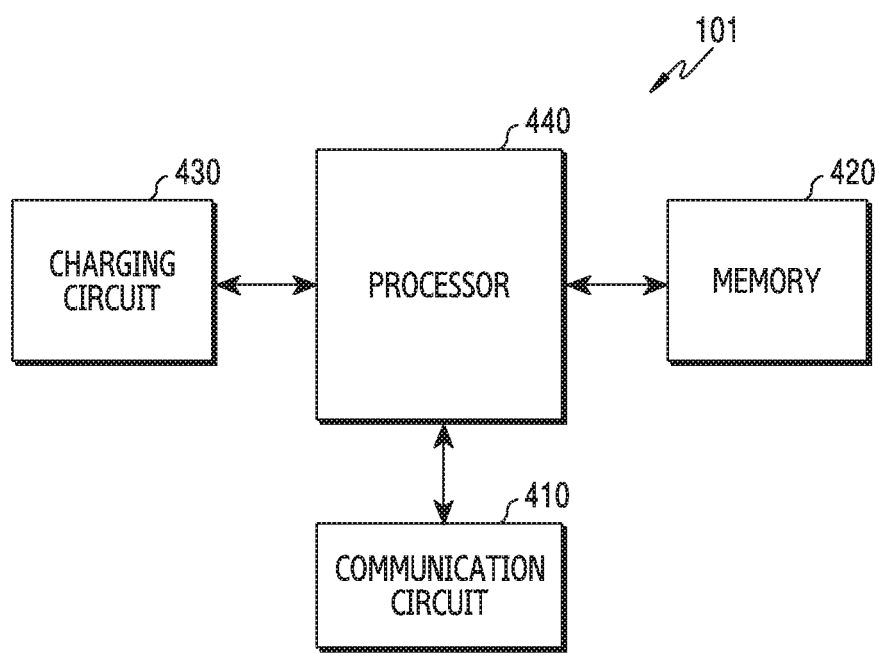
FIG. 4 illustrates a functional configuration of an electronic device according to an embodiment of the disclosure.

FIG. 4 illustrates a functional configuration of an electronic device according to an embodiment of the disclosure.

Referring to FIG. 4, the functional configuration of the electronic device 101 may include the functional configuration of the electronic device 101 shown in FIG. 1. The terms ' . . . part' and ' . . . unit' used hereinafter may mean a unit for processing at least one function or operation, which may be implemented by hardware or software, or a combination of hardware and software.

The electronic device 101 may include a communication circuit 410, a memory 420, a charging circuit 430, and a processor 440.

The communication circuit 410 may perform functions for transmitting and receiving a signal via a wireless channel. For example, the communication circuit 410 may perform conversion between a baseband signal and a bit stream according to the physical layer standard of a system. For example, when transmitting data, the communication circuit 410 may generate complex (modulation?) symbols by encoding and modulating the transmit bit stream. In addition, when receiving data, the communication circuit 410 may restore the received bit stream by demodulating and decoding the baseband signal. In addition, the communication circuit 410 may upconvert a baseband signal into an RF band signal, transmit the signal through an antenna, and downconvert the RF band signal received through the antenna into a baseband signal. For example, the communication circuit 410 may include a transmit filter, a receive filter, an amplifier, a mixer, an oscillator, a DAC, an ADC, or the like. According to an embodiment of the disclosure, the communication circuit 410 may include at least one transceiver.

In addition, the communication circuit 410 may include a plurality of transmit and receive paths. Further, the communication circuit 410 may include an antenna unit. According to an embodiment of the disclosure, the communication circuit 410 may be operatively coupled with at least one antenna. For example, the communication circuit 410 may be coupled with a single antennal. In addition, for example, the communication circuit 410 may be coupled with a plurality of antennas. In addition, for example, the communication circuit 410 may be coupled with at least one antenna array composed of multiple antenna elements. In terms of hardware, the communication circuit 410 may be composed of digital circuits and analog circuits (e.g., radio frequency integrated circuits (RFICs)). Here, the digital circuits and analog circuits may be implemented in one package. In addition, the communication circuit 410 may include a plurality of RF chains. In addition, according to an embodiment of the disclosure, the communication circuit 410 may include a radio frequency (RF) block (or RF unit). The RF block may include a first RF circuitry associated with an antenna and a second RF circuitry associated with baseband processing. The first RF circuitry may be referred to as an RF-A (antenna). The second RF circuitry may be referred to as a RF-B (baseband).

The communication circuit 410 may transmit and receive a signal. The communication circuit 410 may receive a downlink signal. In addition, the communication circuit 410 may transmit an uplink signal. In addition, the communication circuit 410 may receive a satellite signal (e.g., global positioning system (GPS) signal). In addition, the communication circuit 410 may include different communication modules for processing signals of different frequency bands. Further, the communication circuit 410 may include a plurality of communication modules to support multiple different wireless access technologies. For example, the different wireless access technologies may include Bluetooth low energy (BLE), Wi-Fi, Wi-Fi Gigabyte (WiGig), a cellular network (e.g., long term evolution (LTE)), new radio (NR), or the like. In addition, the different frequency bands may include a super high frequency (SHF) band (e.g., 2.5 GHz, 5 GHz), a millimeter wave (e.g., 38 GHz, 60 GHz, etc.) band. The communication circuit 410 may also use the same type of radio access technology on different frequency bands (e.g., unlicensed bands for licensed assisted access (LAA), citizens broadband radio service (CBRS) (e.g., 3.5 GHz), etc.).

The communication circuit 410 may transmit and receive a signal as described above. In accordance with this, all or some of the communication circuit 410 may be referred to as "transmitter", "receiver", or "transceiver". In addition, in the following description, transmission and reception performed via a wireless channel are used to mean that the processing is performed as described above by the communication circuit 410.

The memory 420 may store data, such as a basic program, an application program, and setting information for the operation of the electronic device 101. The memory 420 may be composed of a volatile memory, a nonvolatile memory, or a combination of the volatile memory and the nonvolatile memory. In addition, the memory 420 may provide stored data at the request of the processor 440. According to various embodiments, the memory 420 may store information on a mapping table that stores a charge current value corresponding to the communication setting of the electronic device 101. In addition, according to various embodiments, the memory 420 may store information on a mapping table that stores a charge current value according to the communication quality of the electronic device 101. In addition, according to various embodiments, the memory 420 may store information on a rule for determining a charge current according to at least one of a communication setting or communication quality of the electronic device 101.

The charging circuit 430 may provide a charge current. The charging circuit 430 may be operatively coupled with a battery. The charging circuit 430 may supply power acquired from a battery to each component of the electronic device 101. In addition, the charging circuit 430 may provide a charge current to a battery (not shown). The charging circuit 430 may perform charging of a battery by providing a battery with a charge current.

The processor 440 may control overall operations of the electronic device 101. The processor 440 may transmit and receive a signal through the communication circuit 410. In addition, the processor 440 may write data in the memory 420 and read it. The processor 440 may perform functions of a protocol stack required in communication standards. To this end, the processor 440 may include at least one processor or microprocessor. In addition, the processor 440 operatively coupled with the communication circuit 410 may include a CP. The processor 440 may include various modules for performing communication.

Further, the processor 440 may adaptively determine a charge current and control the charging circuit 430 to perform charging, according to various embodiments. According to various embodiments, the processor 440 may adaptively control the charge current by identifying the communication setting of the electronic device 101. In addition, according to various embodiments, the processor 440 may adaptively control the charge current by determining each communication state or signal quality before and after charging. In addition, according to various embodiments, the processor 440 may adaptively control the charge current according to the field of a communication connection.

The operations of the processor 440 according to various embodiments, which are an instruction set or codes stored in the memory 420, may be storage spaces storing instructions/codes at least temporarily resided in the processor 440 or the instructions/codes, or a part of a circuitry constituting the processor 440, or a module for performing a function of the processor 440. According to various embodiments, the processor 440 may control the electronic device to perform operations according various embodiments described below.

An electronic device according to various embodiments may include a battery, at least one transceiver, and at least one processor operatively coupled with the at least one transceiver, wherein the at least one processor may be configured to detect a charging event for the battery, to determine a difference value between first communication quality before detection of the charging event and second communication quality after detection of the charging event, to determine a charge current value, based on the difference value, and to charge the battery according to the determined charge current value.

According to various embodiments, in order to determine the charge current value, the least one processor may be configured to determine a first value as the charge current value when the difference value exceeds a threshold value, and to determine a second value as the charge current value when the difference value is less than or equal to the threshold value, and the first value may be smaller than the second value.

According to various embodiments, the second value may be a maximum charge current value that can be applied to the battery.

According to various embodiments, in order to determine the charge current value, the at least one processor may be configured to determine the charge current value, based on the second communication quality when the difference value exceeds a threshold value, and to determine a default setting value currently being charged in the battery as the charge current value when the difference value is less than or equal to the threshold value.

According to various embodiments, in order to determine the charge current value, based on the second communication quality, the at least one processor may be configured to determine a first value as the charge current value when the second communication quality is less than a first threshold value, and to determine a second value as the charge current value when the second communication quality is greater than or equal to the first threshold value, wherein the first value may be smaller than the second value.

According to various embodiments, in order to determine the charge current value, based on the second communication quality, the at least one processor may be configured to determine a first value as the charge current value when the second communication quality is less than a first threshold value, to determine a second value as the charge current value when the second communication quality is greater than or equal to the first threshold value and is less than a second threshold value, and to determine a third value as the charge current when the second communication quality is greater than or equal to the second threshold value, wherein the first value may be smaller than the second value and the second value may be smaller than the third value.

According to various embodiments, the at least one processor may additionally be configured to identify a communication setting associated with a wireless link formed by the electronic device, and to determine the threshold values, based on the identified communication setting.

According to various embodiments, in order to determine the charge current value, the at least one processor may be configured to identify a communication setting associated with a wireless link formed by the electronic device, to determine the charge current value, based on the difference value when the identified communication setting belongs to a first group, and the at least one processor may additionally be configured to determine a maximum charge current value as the charge current value when the identified communication setting belongs to a second group.

According to various embodiments, the communication setting may include at least one of a communication scheme, a communication mode, or a communication channel, wherein the communication scheme may refer to a radio access technology with which the electronic device is communicating, the communication mode may refer to a frequency band according to the communication scheme, and the communication channel may refer to a type of radio channel according to the communication scheme.

According to various embodiments, in order to determine the difference value, the at least one processor may be configured to determine the first communication quality by measuring the strength of a first signal received from a base station, and to determine the second communication quality by measuring the strength of a second signal received from the base station.

According to various embodiments, an electronic device may include a battery, at least one transceiver, and at least one processor operatively coupled with the at least one transceiver, wherein the at least one processor may be configured to determine a range of received signal strength of each of a plurality of fields by measuring a degree of communication quality decreasing depending on a change in the strength of the received signal, to determine a first received signal strength value while the battery is charged, to identify a field corresponding to the first received signal strength among the plurality of fields, to identify a charge current value corresponding to the identified field among the plurality of charge current values, and to charge the battery according to the identified charge current value, wherein the plurality of fields may correspond to the plurality of charge current values, respectively.

Although not illustrated in FIG. 4, the electronic device 101 may further include a battery for the operations of each component. The battery may receive the charge current by the charging circuit 430. The charge current may be provided to the battery, so that the charging of the battery may be performed. That is, through the charge current, power may be supplied to the battery. In addition, the battery may enable each component on the system of the electronic device 101 to operate using the supplied power.

The configuration of the electronic device illustrated in FIG. 4 is only an example of a terminal and is not limited to the configuration illustrated in FIG. 4. That is, according to various embodiments, some components may be added, deleted, or changed.

The functional configuration of the electronic device 101 for controlling charge current according to the disclosure has been described via FIG. 4. Hereinafter, via FIGS. 5 to 6, operations and specific examples of the electronic device 101 for adaptively configuring the charge current, based on the current communication setting will be described.

Charge Current Control According Communication Setting

Figure 5:
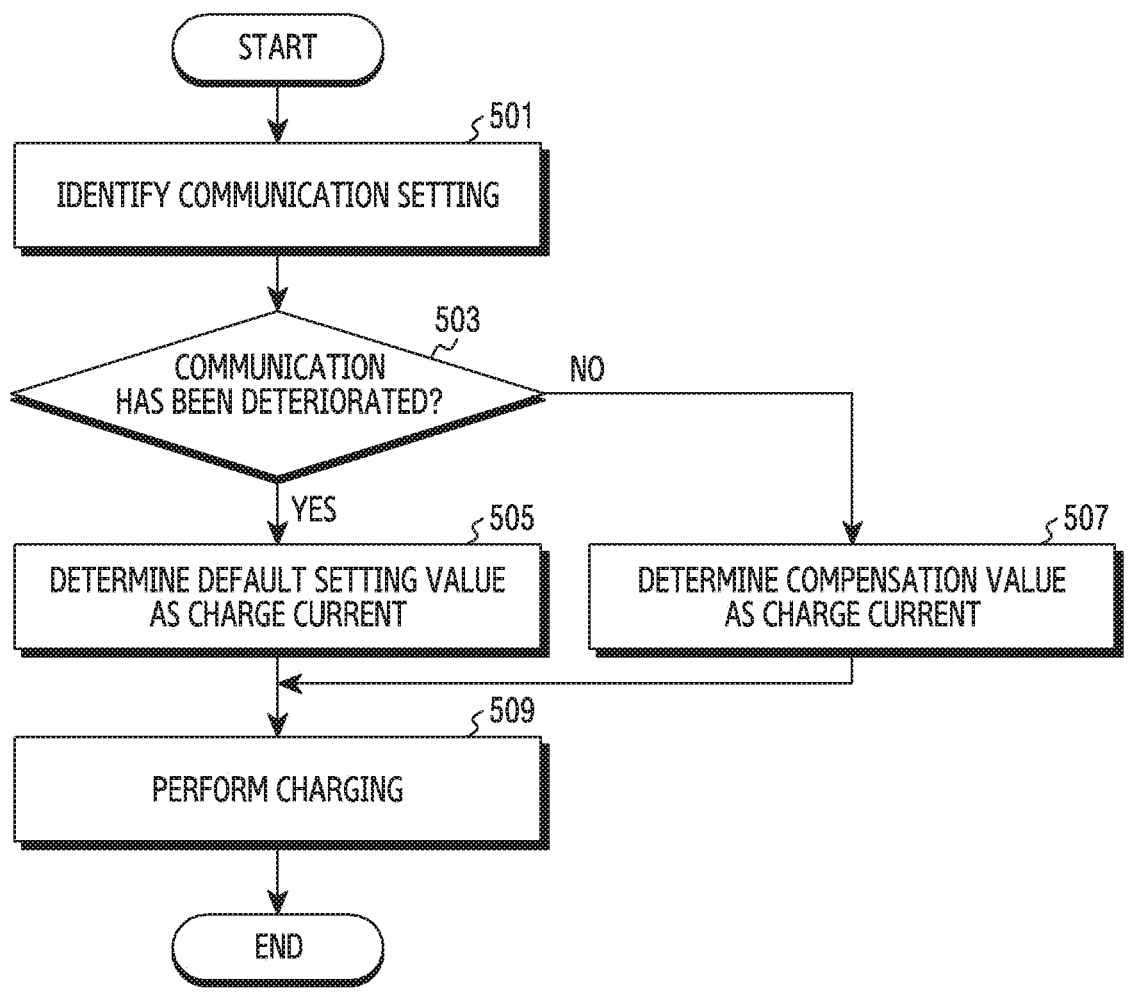
FIG. 5 illustrates an operation flow of an electronic device for determining a charge current according to a communication setting according to an embodiment of the disclosure.

FIG. 5 illustrates an operation flow of an electronic device for determining a charge current according to a communication setting according to an embodiment of the disclosure.

The operations of the electronic device 101 may be performed by the processor 440 of FIG. 4. According to various embodiments, the processor 440 may include an application processor (AP) or a communication processor (CP).

Referring to FIG. 5, in operation 501, the electronic device 101 may identify a communication setting. The electronic device 101 may perform communication. The electronic device 101 may be in a communication connection state. The electronic device 101 may be in communication. Here, the "in communication" may be a state in which the electronic device 101 can transmit a signal to or receive a signal from other devices. For example, the electronic device 101 may form a wireless link by accessing to a wireless network via a base station (e.g., 'access point (AP)', 'eNodeB (eNB)', '$5^{th}$ generation node (5G node)', '5G NodeB (NB)', 'wireless point', 'transmission/reception point (TRP)', 'distributed unit (DU)', 'radio unit (RU)', 'remote radio head (RRH)'). The electronic device 101 may receive a downlink signal from a base station or transmit an uplink signal to the base station, via a wireless link. In addition, for example, the electronic device 101 may form a direct link with other electronic devices (e.g., Bluetooth pairing, sidelink, Wi-Fi direct). In addition, the electronic device 101 may be in a state capable of receive a signal from any device (e.g., satellite, beacon signal, broadcast device).

The electronic device 101 may identify a communication setting of the electronic device 101. The electronic device 101 may identify at least one setting for the communication connection currently operating in the electronic device 101. The electronic device 101 may identify a setting related to a communication connection of the electronic device 101, that is, a communication setting, through at least one of an AP or a CP of the electronic device 101. Hereinafter, the communication setting according to various embodiments may include at least one of a communication scheme, a communication mode, or a communication channel.

The communication scheme according to various embodiments may be defined according to the type of link between the electronic device 101 and other devices (e.g., base station, terminal, satellite, etc.). The communication scheme may include a radio access technology (RAT) of a link. For example, the communication scheme may be at least one of global system mobile communication (GSM), code division multiple access (CDMA), wideband CDMA (WCDMA), high speed packet access (HSPA), HSPA plus, worldwide interoperability for microwave access (WiMAX), long term evolution (LTE), new radio (NR), other 5G communication scheme, Wi-Fi, GPS, and near field communication (NFC), Bluetooth, Bluetooth low energy (BLE).

In addition, the communication scheme according to various embodiments may be defined according to the communication module used in the electronic device 101. For example, the communication scheme may include a wireless communication scheme or a wired communication scheme. In addition, for example, the communication scheme may include one of a cellular communication scheme according to a cellular communication module (e.g., NR module), a short range communication scheme according to a short range communication module (e.g., Wi-Fi module), or a satellite communication scheme according to satellite communication module (e.g., GNSS).

The communication mode according to various embodiments may mean a mode supported according to the capability of the electronic device 101 or a mode in which the electronic device 101 operates, in the communication scheme. The communication mode may be variously defined according to a communication scheme.

In some embodiments, the communication mode may be defined according to the wireless standard specification of a communication scheme. For example, when the communication scheme of the electronic device 101 is Wi-Fi, the communication mode of the electronic device 101 may include at least 802.11a, 802.11b, 802.11g, 802.11ac, or 802.11ax, which are wireless standards of 802.11 of IEEE. In some other embodiments, the communication mode may be defined according to the country of operation of a communication scheme. For example, when the communication scheme of the electronic device 101 is a satellite communication, the communication mode of the electronic device 101 may include at least one of GPS of USA, GLONASS of Russia, Galileo of the European Union (EU), Beidou of China, Juntencho of Japan, and IRNSS in India.

In some other embodiments, the communication mode may be defined according to the frequency band of a communication scheme. For example, when the communication scheme of the electronic device 101 is GSM, the communication mode may include at least one of GSM-850, GSM-900, DCS-1800, or PCS-1900. For another example, when the communication scheme of the electronic device 101 is LTE, the communication mode may include at least one of B1, B2, B3, . . . , or B66.

In some other embodiments, the communication mode may be defined based on a modulation scheme according to a communication scheme. For example, when the communication scheme of the electronic device 101 is LTE, the communication mode may include OFDM. For another example, when the communication scheme of the electronic device 101 is NR, the communication mode may include at least one of CP-OFDM or DFT-S OFDM.

The communication channel according to various embodiments may mean a channel for performing communication. The communication channel may indicate a channel according to a communication scheme or a communication mode. For example, when the communication scheme of the electronic device 101 is Wi-Fi and the communication mode is 802.11a, the communication channel may include 44ch, 100ch, and 161ch. For example, when the communication scheme of the electronic device 101 is Wi-Fi and the communication mode is 802.11g, the communication channel may include 1ch, 6ch, and 13ch. In addition, for example, when the communication scheme of the electronic device 101 is LTE, the communication channel may include at least one of a physical channel (e.g., physical downlink control channel (PDCCH), physical downlink shared channel (PDSCH), physical uplink control channel (PUCCH), physical uplink shared channel (PUSCH), physical random access channel (PRACH), etc.), a transmission channel (e.g., downlink shared channel (DL-SCH), uplink shared channel (UL-SCH)), and a logic channel (e.g., dedicated control channel (DCCH), multicast control channel (MCCH)).

According to various embodiments, a communication setting may be determined based on at least one of a communication scheme, a communication mode, or a communication channel. In some embodiments, the communication setting may be determined based on the communication scheme. For example, the electronic device 101 may identify a communication setting in which a communication scheme is Bluetooth. For another example, the electronic device 101 may identify a communication setting in which a communication scheme is WCDMA. In some other embodiments, the communication setting may be determined based on a communication scheme and a communication channel. For example, the electronic device 101 may identify a communication setting in which a communication scheme is LTE and a communication channel is PDCCH. For another example, the electronica device 101 may identify a communication setting in which is NR, and a communication is PDSCH. In some other embodiments, a communication setting may be determined based on a communication scheme and a communication mode. For example, the electronic device 101 may identify a communication setting in which a communication scheme is Wi-Fi, a communication mode is 802.11a, and a communication channel is 44ch.

According to various embodiments, in operation 503, the electronic device 101 may determine whether the communication performance according to the communication setting is deteriorated by a charge current. The electronic device 101 may determine whether the charge current causes a decrease in communication quality due to the communication setting. The electronic device 101 may determine whether communication quality is degraded in the communication setting. When the communication quality of the communication setting is lowered, the electronic device 101 may determine that the communication performance is deteriorated due to the charge current in the communication setting. In contrast, when the charge current does not deteriorate the communication quality of the communication setting, the electronic device 101 may determine that there is no deterioration in communication performance. The degradation of the communication quality may be determined in various ways.

According to various embodiments, the electronic device 101 may determine whether the quality of the communication setting is degraded, based on the grouping related to communication performance deterioration. Groups may be defined according to the degree to which the charge current according to the communication setting affects the electronic device 101. In some embodiments, the groups may include a first group in which the charge current affects the electronic device 101 more than a threshold value and a second group in which the charge current affects the electronic device 101 below the threshold value. When the communication setting belongs to the first group, the electronic device 101 may adjust the charge current in order to cancel the influence due to the charge current. On the other hand, when the communication setting belongs to the second group, the electronic device 101 may not adjust the charge current because it is not necessary to eliminate the influence due to the charge current. In some other embodiments, the groups may include at least three or more groups according to the degree to which the charge current affects the electronic device. Depending on which group the communication setting belongs to, the value of the charge current may be adjusted differently.

According to various embodiments, the electronic device 101 may determine a group for the communication setting, based on a frequency band according to the communication setting. The electronic device 101 may determine whether the quality is lowered according to the frequency band. For example, a signal transmitted through a coil during wireless charging may act as interference to a wireless signal in a certain frequency band. As an example, the electronic device 101 may preset the communication settings related to the 700 to 800 MHz frequency band as a group having a decrease in communication quality, due to the influence of interference according to a signal transmitted through a coil to provide power.

According to various embodiments, the electronic device 101 may differently configure the groups for communication settings according to the characteristics (e.g., capability) of the electronic device 101. For example, based on a hardware configuration (e.g., whether a certain communication module is provided or physical distance between a charge circuit and a communication circuit) of the electronic device 101, groups may be configured to have different communication settings included in each group. For another example, based on a supportable communication scheme (e.g., communication standard installed in a modem) of the electronic device 101, groups may be configured to have different settings included in each group.

According to various embodiments, the electronic device 101 may identify a table indicating which communication setting belongs to which group. According to an embodiment of the disclosure, the electronic device 101 may store a plurality of tables. The electronic device 101 may identify at least one table among the plurality of tables, based on the characteristics of the electronic device 101. For example, when the electronic device 101 includes band switching circuits for providing B2, B4, and B30 bands, the electronic device 101 may identify at least one table corresponding to an LTE communication scheme and the B2, B4, and B30 bands among the plurality of tables. The electronic device 101 may determine a group corresponding to the communication setting, based on the identified table, and determine whether the communication performance is deteriorated.

According to various embodiments, the electronic device 101 may determine whether the quality of the communication setting is deteriorated, based on communication setting and communication quality. The electronic device 101 may determine a threshold value determined according to each element (e.g., communication scheme, communication mode, or communication channel) of the communication setting. The threshold value may be a threshold value for distinguishing whether the communication quality of the electronic deice 101 guarantees the communication quality of a certain level or higher in the corresponding communication setting. The electronic device 101 may determine whether the quality of the communication setting is lowered by comparing the communication quality with a corresponding threshold value. In the disclosure, the communication quality may be at least one of beam reference signal received power (BRSRP), reference signal received power (RSRP), reference signal received quality (RSRQ), received signal strength indicator (RSSI), signal to interference and noise ratio (SINR), carrier to interference and noise ratio (CINR), signal to noise ratio (SNR), error vector magnitude (EVM), bit error rate (BER), and block error rate (BLER), for example. In addition to the above-described examples, other terms having equivalent technical meanings or other metrics indicating channel quality may be used. In the disclosure, high channel quality refers to a case in which a channel quality value related to a signal size is large or a channel quality value related to an error rate is small. Higher channel quality may mean that a smooth wireless communication environment is guaranteed.

If there is deterioration in communication performance due to a charge current in the corresponding communication setting, the electronic device 101 may perform operation 505. If there is no deterioration in the corresponding communication performance due to a charge current in the communication setting, the electronic device 101 may perform operation 507.

According to various embodiments, in operation 505, the electronic device 101 may determine the default setting value as a charge current. When the current communication setting is not included in the group including the communication settings determined to be deteriorated due to the charge current, the electronic device 101 may operate in a basic mode. In other words, in the basic mode, the charge current may have an impact below the threshold value or no influence at all on the communication performance of the electronic device 101. The basic mode may be referred to as a charge noiseless mode.

The electronic device 101 may determine the default setting value as the charge current, in the basic mode. According to various embodiments, the default setting value may mean the maximum chargeable current of the electronic device 101. In the current communication setting, even when the electronic device 101 is being charged, the electronic device may not be affected by the charge current during communication. In order to shorten the charge time, the electronic device 101 may perform charging with the default setting value which is the maximum charge current. The electronic device 101 may provide a decrease in charge time by performing charging with the maximum charge current. The electronic device 101 does not lower the current when the communication quality according to the communication setting is not affected by the charge current or when the influence is insufficient, thereby providing a shorter charge time than when lowering the charge current collectively.

According to various embodiments, in operation 507, the electronic device 101 may determine a compensation value as a charge current. When the current communication setting is included in the group including the communication settings determined to be deteriorated due to the charge current, the electronic device 101 may operate in a compensation mode. In other words, in the compensation mode, the charge current may affect the communication performance of the electronic device 101 above a threshold value. The compensation mode may be referred to as a charge noise mode. For example, the communication setting of the electronic device 101 may include Wi-Fi as a communication scheme, 802.11a as a communication mode, and 44ch as a communication channel. The electronic device 101 may determine that there is communication deterioration due to noise of about 10 dB in the corresponding communication setting in the electronic device 101 during charging. The electronic device 101 may enter the compensation mode.

In the compensation mode, the electronic device 101 may determine a compensation value as the charge current. The compensation value may be lower than the default setting value. The electronic device 101 may lower the charge current in order to reduce communication performance deterioration due to the charge current. The electronic device 101 may determine the charge current a compensation value having a value lower than the default setting value as the charge current.

According to various embodiments, the electronic device 101 may determine the compensation value in various ways. In some embodiments, electronic device 101 may determine a predetermined compensation value. The electronic device 101 may identify a compensation value predetermined as a preliminary value in addition to the basic setting value, and determine the compensation value as the charge current. In some other embodiments, the electronic device 101 may determine the compensation value, based on the degree of change in the communication state. For example, the electronic device 101 may determine the compensation value, based on a difference in reception quality of a reference signal before and after charging. The larger the reception quality difference, the greater the performance deterioration due to charging, so that a smaller compensation value can be determined. In contrast, the smaller the reception quality difference, the less performance deterioration due to charging, so that a larger compensation value can be determined. According to an embodiment of the disclosure, the table indicating the compensation value depending on the reception quality difference may be stored in the electronic device 101. In some other embodiments, the electronic device 101 may determine the compensation value, based on the field of a communication connection. The stronger the field, the less the deterioration in communication performance. This is because the field is related to the power of the signal, and the higher the power, the smoother the communication performance. The stronger the field, the electronic device 101 may determine the compensation value as a larger value. On the other hand, as the field is lower, the electronic device 101 may determine the compensation value as a smaller value. According to an embodiment of the disclosure, a table indicating the compensation value according to a field may be stored in the electronic device 101.

According to various embodiments, in operation 509, the electronic device 101 may perform charging. The electronic device 101 may perform wired charging or wireless charging. The electronic device 101 may perform the wireless charging by providing a battery with the charge current of a charging circuit generated via a voltage provided from a power source or a voltage induced from a wireless coil. As the charge current is supplied to the battery, the voltage of the battery rises. The electronic device 101 may store the amount of power corresponding to the increased voltage of the battery.

The electronic device 101 may increase the charge voltage of the battery by supplying a charge current. The charge current may be a constant current. The electronic device 101 may increase the charge voltage of the battery in proportion to the supply time of the charge current. Since the capacity (e.g., 3300 mAh) of the battery and the value of the voltage (e.g., supply voltage) (e.g., 9 V) supplied to the charging circuit are kept constant, the magnitude of the voltage charged in the battery of the electronic device 101 may be proportional to the charge current. That is, in the graph of the magnitude of the charge voltage over time, the slope of the charge voltage may be a value of the charge current. The electronic device 101 may supply the charge current until the charge voltage of the battery reaches the full voltage (e.g., 4.3 V).

According to various embodiments, the electronic device 101 may control the charge current by controlling an output current, supplied from a charging circuit, using a software/registry code (S/W registry code). In addition, according to various embodiments, the electronic device 101 may change the charge current to be provided, by changing an element value (e.g., resistance, capacitance) of the charging circuit.

Referring to FIG. 5, an example in which the electronic device 101 in the compensation mode determines the charge current to a value lower than the charge current value in the basic mode is described, but various embodiments are not limited thereto. In the compensation mode, which is an operation mode for preventing deterioration of communication quality, an operation of determining the default setting value as the charge current again under other conditions, after operating in the compensation mode according to the communication setting can also be understood as an embodiment of the compensation mode of the disclosure.

Figure 6:
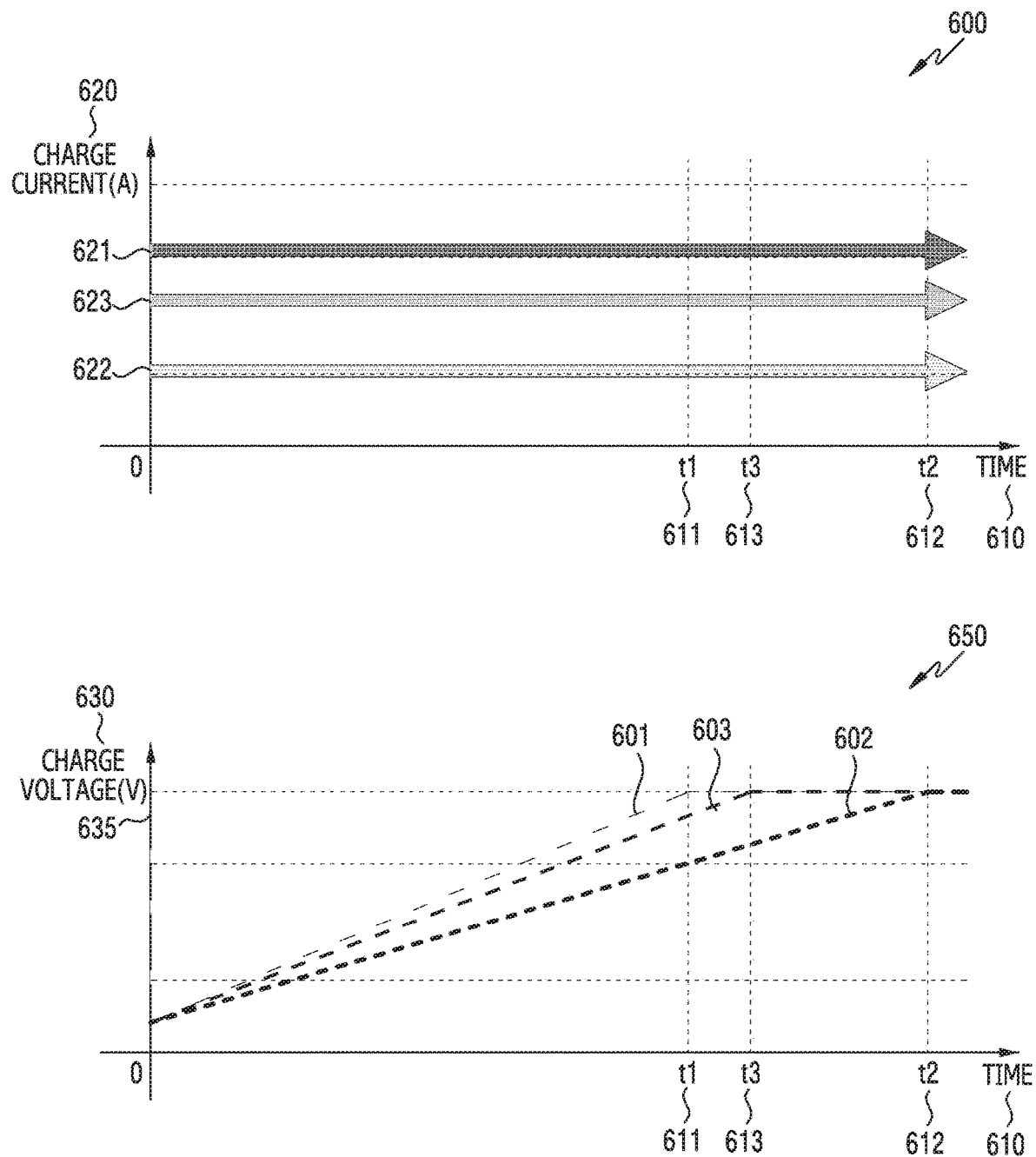
FIG. 6 illustrates a charge current control according to a communication setting according to an embodiment of the disclosure.

FIG. 6 illustrates a charge current control according to communication setting according to an embodiment of the disclosure.

Referring to FIG. 6, an electronic device 101 a situation in which the electronic device 101 operates in one of a basic mode and a compensation mode is described. The electronic device 101 determines the charge current value according to the group to which the communication setting belongs, rather than lowering the charge current regardless of whether the communication performance is deteriorated.

Referring to FIG. 6, a graph 600 represents a charge current 620 according a charging time 610. The horizontal axis of the graph 600 represents a charging time 610, and the vertical axis of the graph 600 represents the charge current 620. Graph 650 represents a charge voltage 630 according to charging time 610. The horizontal axis of the graph 650 represents the charging time 610, and the vertical axis of the graph 650 represents the charge voltage 630. The electronic device 101 may be charged with a constant current until the charge current reaches the full voltage 635 of the battery of the electronic device 101.

The current communication setting of the electronic device 101 may not be deteriorated in communication quality due to the charge current. The electronic device 101 may determine a default setting value 621 as the charge current in order to provide quick charging. The default setting value may be a maximum charge current value of the electronic device 101. If there is no change in the operation mode in the future, the electronic device 101 may be charged according to the first charging state line 601. The charging time of the electronic device 101 may be $t_1$ 611.

In the current communication setting of the electronic device 101, the communication performance may be lowered by a certain range or more due to a charge current. The electronic device 101 may determine the compensation value 622 as the charge current so as to reduce deterioration in communication performance. For example, the electronic device 101 may change the charge current from the default setting value 621 to the compensation value 622. The electronic device 101 may determine the compensation value 622 as the charge current. That is, the electronic device 101 may lower the charge current. The electronic device 101 may lower the charge current to prevent deterioration in communication performance. If there is no change in the operation mode in the future, the electronic device 101 may be charged according to a second charge state line 602. The buffer time of the electronic device 101 may be $t_2$ 612.

During charging, the communication setting of the electronic device 101 may be changed. Alternatively, during charging, the communication quality of the electronic device 101 may be changed. As at least one of the communication setting and the communication quality is changed, the electronic device 101 may differently determine whether the communication performance is deteriorated due to the charge current. According to various embodiments, the electronic device 101 may adjust the charge current based on at least one change in the communication setting or the communication quality. The electronic device 101 may adaptively operate an operation mode during charging. The electronic device 101 may adaptively operate a charge noise mode and a charge noiseless mode. The electronic device 101 may vary the charge current during charging. The electronic device 101 may perform charging with a charge current having a default setting value and then perform charging with a charge current having a compensation value. In addition, the electronic device 101 may perform charging with a charge current having a compensation value and then perform charging with a charge current having a default setting value.

As described above, when the electronic device 101 variably operates the charge current, an average current value may be defined. For example, the electronic device 101 may perform charging with a charge current having an average value 623. According to the charge current of the average value 623, the electronic device 101 may obtain the same result as the charging result according to a third charging state line 603 and the buffer time. The buffer time of the electronic device 101 may be $t_3$ 613. By adaptively controlling the charge current, the electronic device 101 can provide an effect of shortening the buffer time, by a time substantially corresponding to '$t_2$-$t_3$'. The electronic device 101 can provide a greater gain of charge time by controlling the output current of the charging circuit, instead of using a change in the slew rate, drive strength, and the charging circuit.

The electronic device 101 may monitor BER of a wireless signal of the electronic device 101. The electronic device 101 may lower the charge current when BER is greater than or equal to a predetermined threshold value. However, if the charge current is lowered only by looking at the BER collectively, the possibility of an error rate increase due to events (e.g., inserting an earphone or inserting a USB cable) other than the charge current may not be considered. That is, despite reducing the charge current, a situation may occur in which the error rate of the wireless signal does not decrease. Hereinafter, a method for more sophisticated charge current control will be described by identifying whether the communication quality deterioration is a communication quality deterioration due to charging, through FIG. 7.

Charge Current Control According to Communication Quality Change

Figure 7:
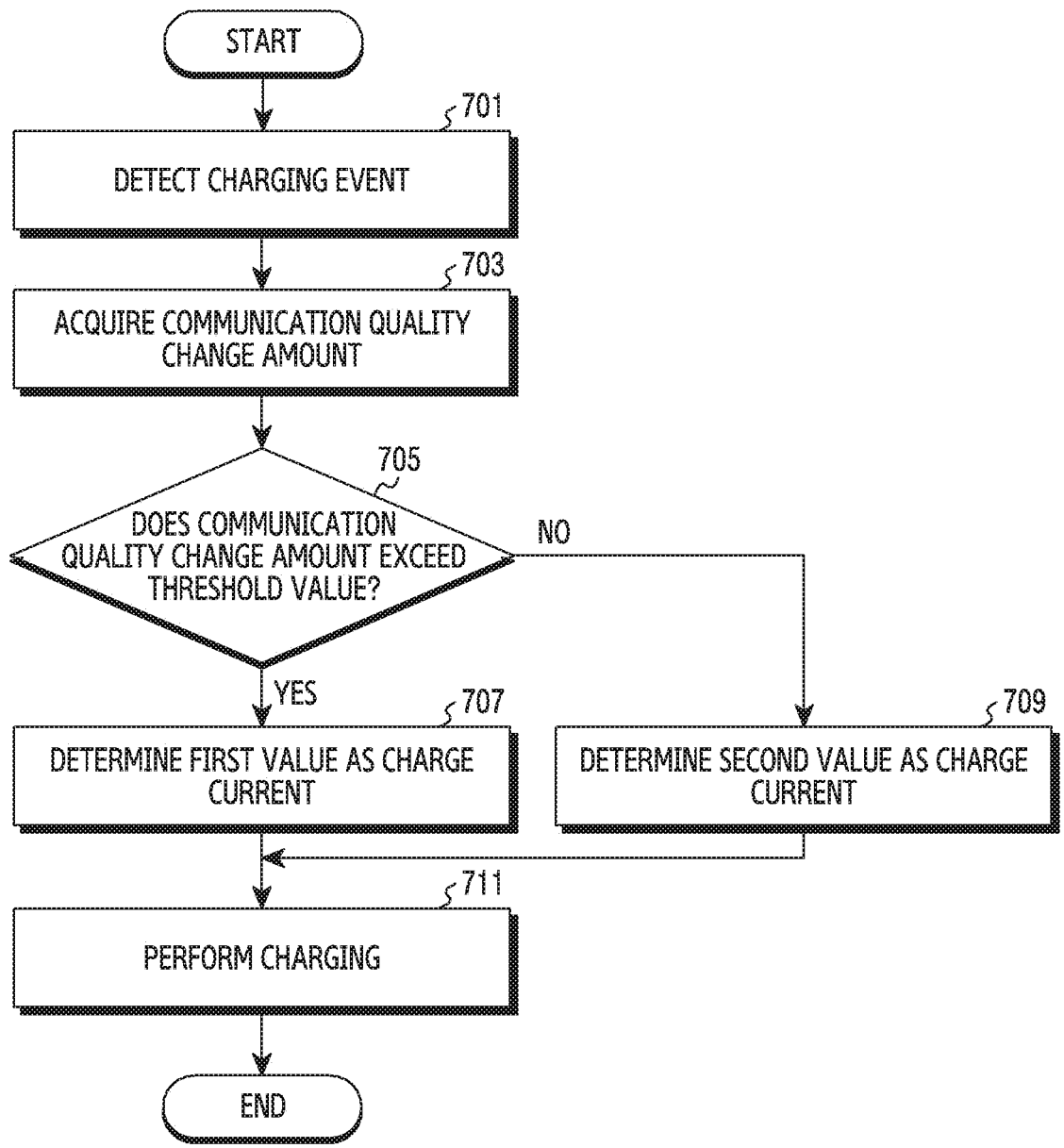
FIG. 7 illustrates an operation flow of an electronic device for determining a charge current according to a change in communication quality according to an embodiment of the disclosure.

FIG. 7 illustrates an operation flow of an electronic device 101 for determining a charge current according to a change in communication quality according to an embodiment of the disclosure. The operation of the electronic device 101 may be performed by a processor 480 of FIG. 4.

Referring to FIG. 7, in operation 701, according to various embodiments, the electronic device 101 may detect a charging event. The electronic device 101 may be in a communication connection state. The electronic device 101 may monitor whether a charging event occurs in the communication connection state. The electronic device 101 may monitor whether the electronic device 101 enters a charging state. For example, the electronic device 101 may determine the occurrence of a charging event by detecting the insertion of a charging cable terminal. In addition, for example, the electronic device 101 may determine the occurrence of the charging event by detecting the generation of an induced current.

The electronic device 101 may determine a charging start time. The electronic device 101 may determine the charging start time via at least one of the AP or the CP of the electronic device 101. The electronic device 101 may determine a time when a charging event is detected. The electronic device 101 may determine a reference time point for determining whether to change the communication performance due to the charging by determining the charging start time. The electronic device 101 may determine a reference time point for distinguishing before and after charging by determining a charging start time.

According to various embodiments, in operation 703, the electronic device 101 may obtain a change amount of communication quality. The communication quality may be at least one of beam reference signal received power (BRSRP), reference signal received power (RSRP), reference signal received quality (RSRQ), received signal strength indicator (RSSI), signal to interference and noise ratio (SINR), carrier to interference and noise ratio (CINR), signal to noise ratio (SNR), error vector magnitude (EVM), bit error rate (BER), and block error rate (BLER). In addition to the above examples, other terms having equivalent technical meanings or other metrics indicating channel quality may be used.

The change amount of communication quality may be defined as a difference between first communication quality and second communication quality. The change amount of communication quality may be a difference value between the first communication quality and the second communication quality. The first communication quality and the second communication quality are divisions according to the time relationship between the two. For example, the electronic device 101 may determine the first communication quality by measuring a signal in the first section. The electronic device 101 may determine the second communication quality by measuring a signal in the second section. The first section may be temporally ahead of the second section. According to various embodiments, the first section may be before the charging start point and the second section may be after the charging start point. In other words, the electronic device 101 may determine a difference value between the first communication quality measured before the charging start time point and the second communication quality specified after the charging start time point as the communication quality change amount. In particular, the first communication quality may be measured before the charge current provides an impact above the threshold on the communication quality. In addition, the second communication quality may be measured after the charge current provides a change above the threshold in communication quality. Accordingly, the electronic device 101 can determine the degree of influence of the communication quality due to the charging by determining the communication quality for each before and after the charging. For example, when the strength of the RF signal before the charging event is −60 dBm and the difference between the strengths of the RF signal after the charging event is −70 dBm, the electronic device 101 may determine 12 dBm as the communication quality change amount.

According to various embodiments, the electronic device 101 may periodically monitor the communication quality. The electronic device 101 may periodically measure the communication quality. The electronic device 101 may acquire first communication quality measured before the charging start time point and second communication quality measured after the charging start time point. According to an embodiment of the disclosure, the electronic device 101 may periodically update the communication quality. When detecting the charging event, the electronic device 101 may obtain the most recently measured communication quality. After detecting the charging event, the electronic device 101 may acquire communication quality via measurement.

According to various embodiments, the electronic device 101 may use a calculation method that is more robust to instantaneous channel changes in order not to mistake the amount of change in the temporary communication quality as the communication quality due to the charge current. For example, the electronic device 101 may determine the first received signal average value by averaging received signal strength values measured during N (N is a natural number of 2 or more) periods before the start of charging. In addition, the electronic device 101 may determine the second received signal average value by averaging received signal strength values measured during M sections (M is a natural number of 2 or more) after the charging start time. The electronic device 101 may determine a difference value between the first received signal average value and the second received signal average value. The difference value may correspond to a communication quality change amount. According to an embodiment of the disclosure, M and N may be set differently.

According to various embodiments, in operation 705, the electronic device 101 may determine whether the change amount of the communication quality exceeds a threshold value. When the change amount of the communication quality exceeds the threshold value, the factor of change of the communication quality may be an inflow of a charge current. The electronic device 101 may determine the degree of deterioration due to a charging event via a change in the communication quality before and after charging. According to various embodiments, the electronic device 101 may determine the threshold value. In some embodiments, the electronic device 101 may identify a predetermined threshold value. The threshold value may be defined for each parameter of the communication quality. For example, the electronic device 101 may determine xdbm as a threshold value when the parameter of communication is RSRP. For another example, the electronic device 101 may determine y% as a threshold value when the parameter of communication is BLER. In some other embodiments, the electronic device 101 may determine a threshold value according to a communication setting. For example, the electronic device 101 may determine a threshold value based on the band in communication. For example, the electronic device 101 may determine a threshold value according to the location of the band in communication or the number of bands in use. In addition, for example, the electronic device 101 may determine a threshold value according to the number of communication modules (e.g., LTE module and Wi-Fi communication module) in use.

The electronic device 101 may perform operation 707 when the change amount of the communication quality exceeds a threshold value. The electronic device 101 may perform operation 709 when the change amount of the communication quality does not exceed the threshold value.

According to various embodiments, in operation 707, the electronic device 101 may determine the first value as a charge current. The electronic device 101 may determine that the charge current may affect the communication performance of the electronic device 101. The electronic device 101 may lower the charge current. The charge current may be a default value immediately after charging. The electronic device 101 may determine a first value lower than the default setting value as the charge current. For example, the default setting value may be a maximum charge current value. The electronic device 101 may provide an improvement in communication performance during charging by reducing the charge current. By reducing the charge current, the communication quality can be increased.

According to various embodiments, the electronic device 101 may determine the first value in various ways. In some embodiments, the electronic device 101 may determine the first value as a predefined value. For example, the default setting value may be 1.8 A (ampere), which is the maximum charge current, and the first value may be defined to 1.2 A. The electronic device 101 may identify a first predefined value and determine the identified first value as the magnitude of the charge current. In some other embodiments, the electronic device 101 may determine the first value, based on the communication quality. The electronic device 101 may determine the first value in proportion to the size of the current communication quality. For example, when the communication quality is guaranteed at a certain level or higher, since the electronic device 101 may not experience a service failure even if there is performance deterioration, the larger the recently measured communication quality, the larger the first value is determined. Of course, the first value may be a value lower than the maximum charge current. In some other embodiments, the electronic device 101 may determine the first value, based on the change amount of the communication quality. As the change amount of the communication quality is larger, it can be recognized that the default setting value, which is the current charge current, causes more serious communication performance degradation. As the amount of change in communication quality increases, the electronic device 101 may lower the first value. The electronic device may determine how much to reduce the size from the default setting value in proportion to the change amount of the communication quality.

According to various embodiments, in operation 709, the electronic device 101 may determine a second value as the charge current value. The electronic device 101 may determine that the charge current does not affect the communication performance of the electronic device 101. The current charge current may be a default setting value. According to an embodiment of the disclosure, the electronic device 101 may maintain the charge current. The second value may be the default setting value. In this case, the default setting value may be a maximum charge current value. In addition, according to an embodiment of the disclosure, the electronic device 101 may increase the charge current. The default setting value may be a value lower than the maximum charge current value. The electronic device 101 may determine a value higher than the default setting value or the maximum charge current value as the second value. Since the charge current does not affect the current communication quality, the electronic device 101 can provide a shortening of the charging time by maintaining the charge current set to the maximum current or by increasing the charge current.

According to various embodiments, in operation 711, the electronic device 101 may perform charging. The electronic device 101 may perform wired charging or wireless charging. By using the charge current value determined according to the change amount of the communication quality in the charging event, the electronic device 101 can relatively exclude the reception quality deterioration due to other factors. The electronic device 101 can optimize between guaranteeing a certain level of communication quality and shortening the charge time by adaptively setting the charge current, based on the change amount of the communication quality. Since operation 711 corresponds to operation 509, at least some of the detailed description about operation 711 may be omitted.

Referring to FIG. 7, an example of adaptively determining a charge current through the change amount of communication quality is illustrated, but various embodiments are not limited to FIG. 7. Embodiments of FIG. 7 may be combined with at least one embodiment of FIG. 5. In some embodiments, the electronic device 101 may determine a default setting value or a compensation value as the charge current according to a communication setting. When the electronic device 101 determines the default setting value as the charge current, the electronic device 101 may change or maintain the charge current value via whether the change amount of the communication quality is greater than or equal to a threshold value. In some other embodiments, the electronic device 101 may determine that the communication setting belongs to a group related to the deterioration of the communication performance, and then lower the charge current when the amount of change in communication quality is greater than or equal to the threshold value. In addition, the electronic device 101 may determine that the communication setting belongs to a group not related to the deterioration of the communication performance, and then increase the charge current when the amount of change in the communication quality is less than the threshold value. If the communication setting belongs to a group related to the deterioration of the communication performance but the amount of change in communication quality is less than the threshold value or the communication setting does not belong to a group related to the deterioration of the communication performance but the amount of change in communication quality is greater than or equal to the threshold value, the electronic device 101 may maintain the charging current.

When the charge current is constant, that is, in the constant current state, the degree of deterioration of communication quality during charging is closely related to the reception strength of the radio signal. The reception strength of a radio signal may affect the field. Hereinafter, via FIGS. 8 to 9C, a method for controlling a charge current according to the field will be described.

Charge Current Control According to Field

Figure 8:
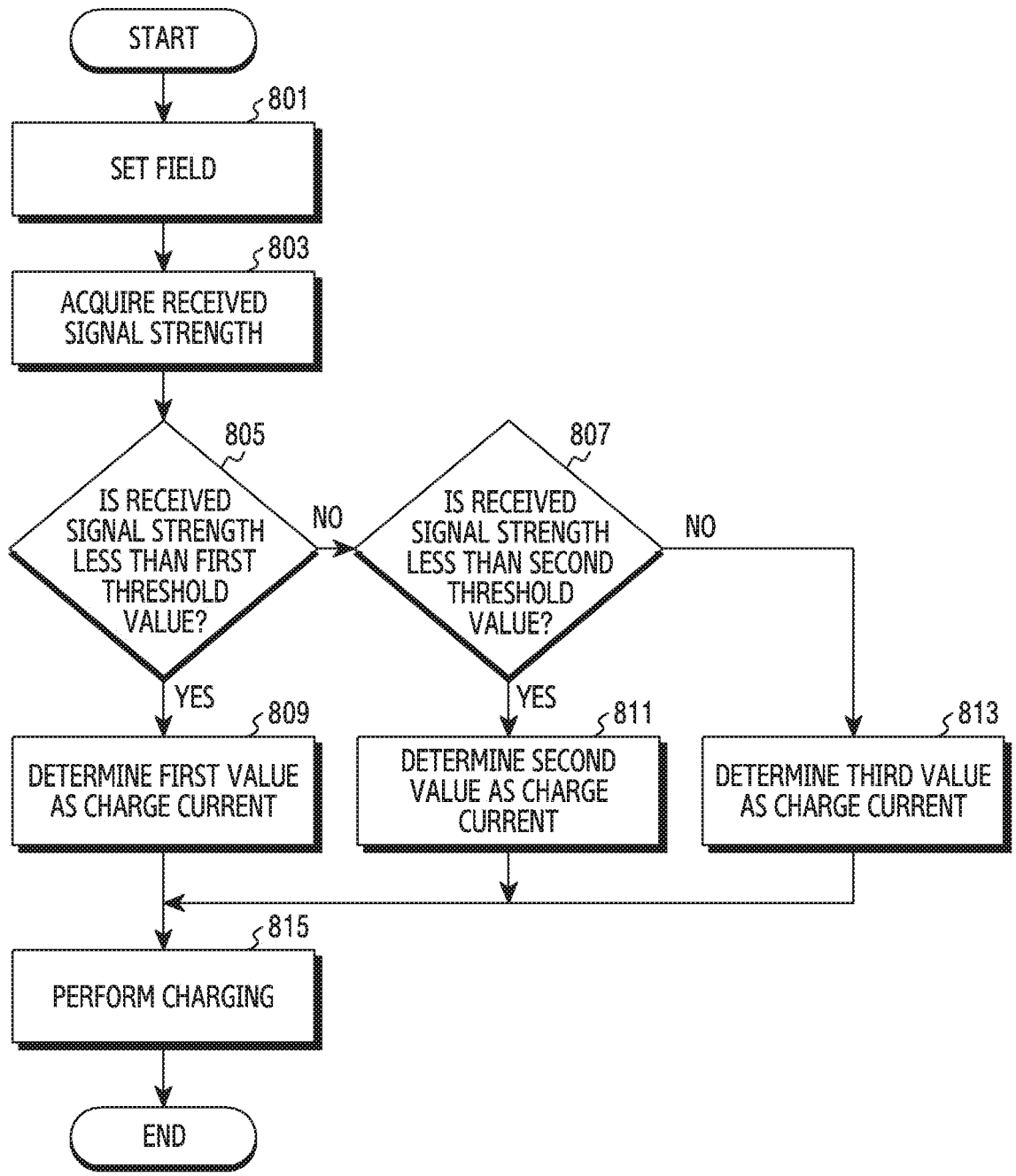
FIG. 8 illustrates an operation flow of an electronic device for determining a charge current according to a field according to an embodiment of the disclosure.

FIG. 8 illustrates an operation flow of an electronic device for determining a charge current according a field according to an embodiment of the disclosure. The operation of the electronic device 101 may be performed by a processor 480 of FIG. 4.

Referring to FIG. 8, in operation 801, the electronic device 101 may set a field. The electronic device 101 may set a field, based on the communication quality. The electronic device 101 may set a field by measuring a degree of deterioration of the communication quality and receiving signal strength. The field may include a range of receiving signal strengths. According to an embodiment of the disclosure, according to the degree of deterioration of the reception, the field may be classified into a strong field, a medium field, and a weak field. In order to set the field, the electronic device 101 may set a range of received signal strength corresponding to a strong field, a medium field, and a weak field. The strong field may be defined as an area where there is no deterioration of communication quality (e.g., degree of deterioration=0 dB), the medium field as an area where the deterioration of communication quality is below a threshold value (e.g., degree of deterioration is 5 dB or less), and the weak field as an area where the deterioration of communication quality exceeds the threshold value (e.g., degree of deterioration exceeds 5 dB). For example, the electronic device 101 may perform charging with a constant charge current of 1.8 A. When receiving a signal of −60 dB from a base station, the electronic device 101 may not be affected by the communication quality from the signal. That is, the charging noise for the electronic device 101 may not exist. Here, the charging noise refers to an index indicating the deterioration of communication quality. As the signal becomes weak and becomes −80 dB, the electronic device 101 may detect a charging noise of about 5 dB. As the strength of the signal becomes weaker to −100 dB, the charging noise may be 10 dB. The electronic device 101 may determine the reception strength range above −60 dB as a strong field area, the reception strength between −60 dB to −80 dB as a medium field area, the reception strength range below −80 dB as a weak field area. That is, by dividing the fields by considering only the charging noise due to the field and charge current, excluding other factors, the degradation in communication quality due to the charge current can be solved more accurately.

According to various embodiments, the electronic device 101 may measure a change in communication quality according to a change in strength of a received signal. For example, the electronic device 101 may measure a change in BER according to a change in SINR of a downlink signal received from a base station. The electronic device 101 may set a first range of SINR where the change in BER is greater than or equal to a threshold value and a second range of SINR where the change in BER is less than the threshold value. The first range may correspond to the weak field area. The second range may correspond to the strong field are. In this manner, the electronic device 101 may determine the range of the received signal strength of each of the plurality of fields. The plurality of fields may correspond to a plurality of charge current values. The electronic device 101 may measure the strength of the received signal and identify a range of the received signal strength accordingly. The electronic device 101 may perform charging by using a charge current value corresponding to the identified range.

According to various embodiments, the distinction of the fields may be determined according to a noise characteristic of the electronic device 101. The noise characteristic may include at least one of a physical distance between the communication circuit and the charging circuit in the electronic device 101, the number of RF transceivers in the electronic device 101, the number of elements (e.g., resistor, inductor) in the charging circuit in the electronic device 101, the size of the element, whether the electronic device 101 is wirelessly charged, and the types of communication modules included in the communication circuit of the electronic device 101.

According to various embodiments, in operation 803, the electronic device 101 may obtain a received signal strength. The electronic device 101 may measure the strength of the received signal. According to various embodiments, the electronic device 101 may measure the strength of a downlink signal received from a base station. The downlink signal may be a synchronization signal. For example, the downlink signal may be at least one of a primary synchronization signal (PSS), a secondary synchronization signal (SSS), or an extended synchronization signal (ESS). The downlink signal may be a reference signal. For example, the downlink signal may be at least one of a cell-specific reference signal (CRS), a channel state information-reference signal (CSI-RS), or a demodulation-reference signal (DM-RS). The electronic device 101 may measure the SINR or RSRP. The electronic device 101 may obtain the received signal strength, based on the measurement.

According to various embodiments, in operation 805, the electronic device 101 may determine whether the received signal strength is less than a first threshold value. The electronic device 101 may determine whether the received signal strength corresponds to the weak field. The first threshold value may be a reference value for discriminating the medium field and the weak field. If the received signal strength is greater than or equal to the first threshold value, the electronic device 101 may perform operation 807. If the received signal strength is less than the first threshold, the electronic device 101 may perform operation 809.

According to various embodiments, in operation 807, the electronic device 101 may determine whether the received signal strength is less than a second threshold value. The second threshold value may be set to be greater than the first threshold value of operation 805. The electronic device 101 may determine whether the received signal strength corresponds to the medium field. The second threshold value may be a reference value for discriminating the medium field and the strong field. When the received signal strength is less than the second threshold value, the electronic device 101 may perform operation 811. If the received signal strength is greater than or equal to the second threshold value, the electronic device 101 may perform operation 813.

According to various embodiments, in operation 809, the electronic device 101 may determine a first value as the charge current. The electronic device 101 may determine that the electronic device 101 is in a weak field state. The electronic device 101 may determine a first value corresponding to the weak field as the charge current in order to reduce performance deterioration due to the charge current. The first value may be a value smaller than a second value and a third value to be described later. The first value may be smaller than the default setting value. The first value may be a value smaller than a maximum charge current. By setting the charge current to a smaller value, an open circuit voltage (VOC) may occur as the charge rate slows. The electronic device 101 may provide improved a communication performance during charging in the weak field area.

According to various embodiments, in operation 811, the electronic device 101 may determine the second value as the charge current. The electronic device 101 may determine that the electronic device 101 is in a medium field state. The electronic device 101 may determine a second value corresponding to the medium field as the charge current in order to reduce performance deterioration due to the charge current. The second value may be smaller than the third value to be described below, and the second value may be greater than the first value described above. The second value may be a value less than the maximum charge current. The electronic device 101 may provide a shorter charge time by performing charging using a higher charge current than the weak field.

According to various embodiments, in operation 813, the electronic device 101 may determine the third value as the charge current. The electronic device 101 may determine that the electronic device 101 is in a strong field state. The electronic device 101 does not need to reduce performance deterioration due to the charge current. The electronic device 101 may determine a third value corresponding to the strong field as the charge current. The third value is a default setting value, and the electronic device 101 may maintain the charge current. According to an embodiment of the disclosure, the default setting value may be a maximum charge current. The electronic device 101 can provide a shorter charge time by performing charging using a higher charge current than the weak and medium fields.

According to various embodiments, in operation 815, the electronic device 101 may perform charging. The electronic device 101 may perform wired charging or wireless charging. By determining the charge current according to the field, the electronic device 101 may provide a high charge current in a situation where charging deterioration does not occur. The electronic device 101 may provide a shortening of the charge time by performing charging using a higher charge current. Since operation 813 corresponds to operation 509, at least some of the detailed description of operation 813 may be omitted.

Referring to FIG. 8, the operations are described as being terminated after the charging is performed in operation 815, but the electronic device 101 may repeatedly perform at least some of the operations of FIG. 8. The electronic device 101 according to various embodiments may adaptively determine the charging current according to the field change. In some embodiments, the electronic device 101 may perform operations 803 to 815 again. For example, the electronic device 101 may perform operations 803 to 815 again by periodically measuring and obtaining a received signal strength.

Referring to FIG. 8, a situation in which a strong field, a medium field, and a weak field exist by dividing an electric field into three types is described, but various embodiments of the disclosure are not limited thereto. The electronic device 101 may adaptively set the charging current by discriminating only the strong field and the weak field, based on one threshold value. Alternatively, the electronic device 101 may adaptively set the charging current by defining four fields, based on three threshold values.

Figure 9A:
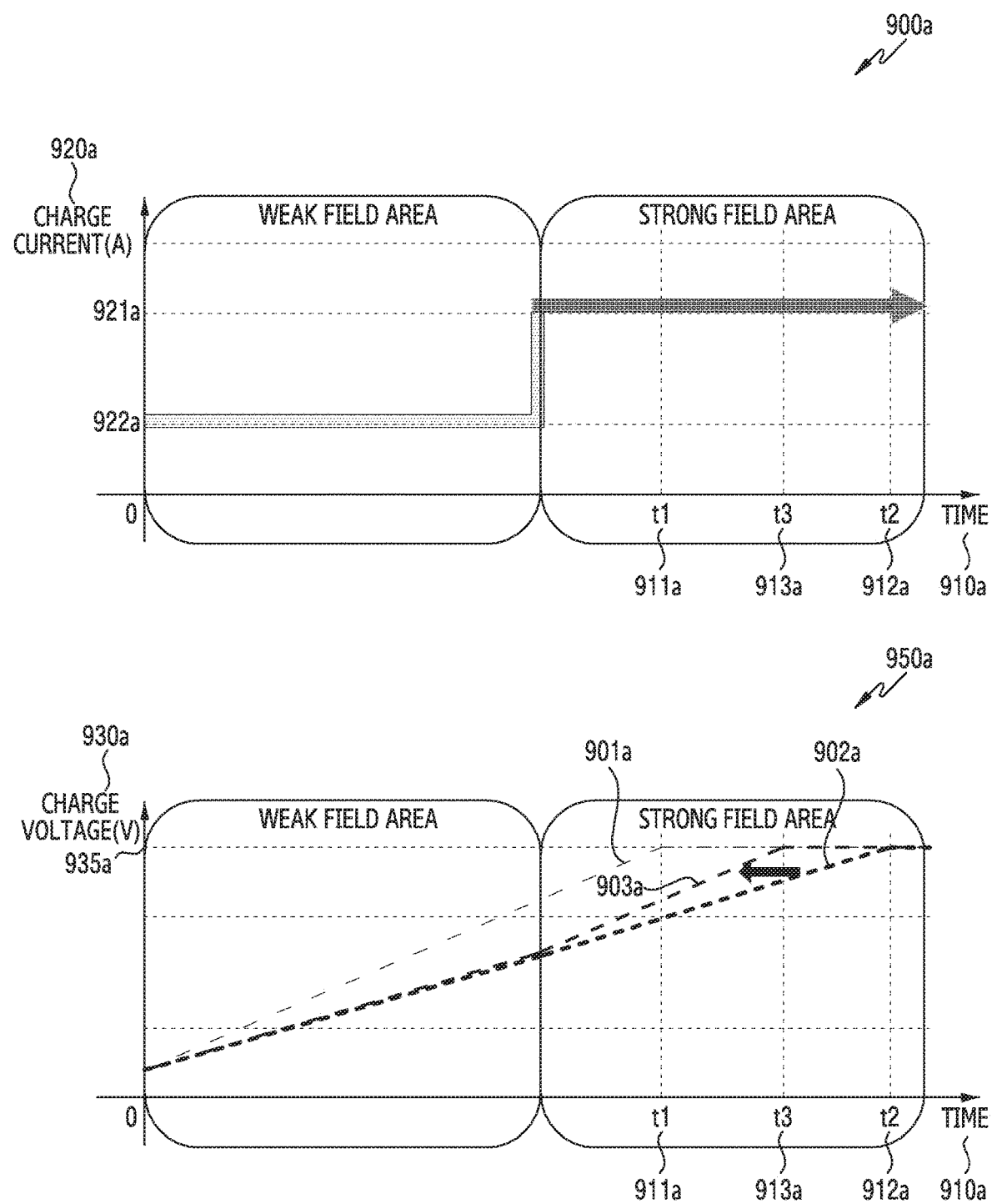
FIG. 9A illustrates a charge current control according to a field change according to an embodiment of the disclosure.

FIG. 9A illustrates a charge current control according to an embodiment of the disclosure.

Referring to FIG. 9A, a situation in which the electronic device 101 transits from a weak field area to a strong field area is described. The electronic device 101 determines a charge current according to the field.

Referring to FIG. 9A, a graph 900a represents a charge current 920a according a charge time 910a. The horizontal axis of the graph 900a represents the charge time 910a, and the vertical axis of the graph 900a represents the charge current 920a. A graph 950a represents a charge voltage 930a according a charge time 910a. The horizontal axis of the graph 950a represents the charge time 910a, and the vertical axis of the graph 950a represents the charge voltage 930a. The electronic device 101 may be charged with a constant current until the charge voltage reaches a full charge voltage 935a of a battery of the electronic device 101.

The electronic device 101 may determine a second value 922a corresponding to the weak field. The electronic device 101 may charge the electronic device 101 with a charge current having the second value. If there is no field change, the electronic device 101 may be charged according to the second charging state line 902a. The charging time of the electronic device 101 may be $t_2$ 912a.

The electronic device 101 may move from the weak field area to the strong field area. For example, the electronic device 101 may move from the edge of the cell to the center of the cell. For another example, an obstacle that is located in a communication path with a base station transmitting a signal to the electronic device 101 is removed. The electronic device 101 may enter the strong field area. The electronic device 101 may determine a first value 921a corresponding to the strong field area. The electronic device 101 may charge the electronic device 101 with a charge current having the first value. The electronic device 101 may be charged according to the third charging state line 903a. The charging time of the electronic device 101 may be $t_3$ 913a. The slope of the third charge state line 903a may be the same as the slope of the charge state line 901a corresponding to the first value. This is because that the charge voltage is proportional to the charge current, in a constant current charging mode. Since there is no deterioration of the communication quality due to the charge current in the strong field area, the electronic device 101 can provide a reduction in the charging time by increasing the charge current. The electronic device 101 can provide the shortening effect in the charging time by a time according to '$t_2$-$t_3$'. In addition, the electronic device 101 can provide an improvement in communication quality in the weak field instead of the charging time t1 911a according to the first value. This is because that the quality of the received signal may be lowered by the high charge current in the weak field.

Figure 9B:
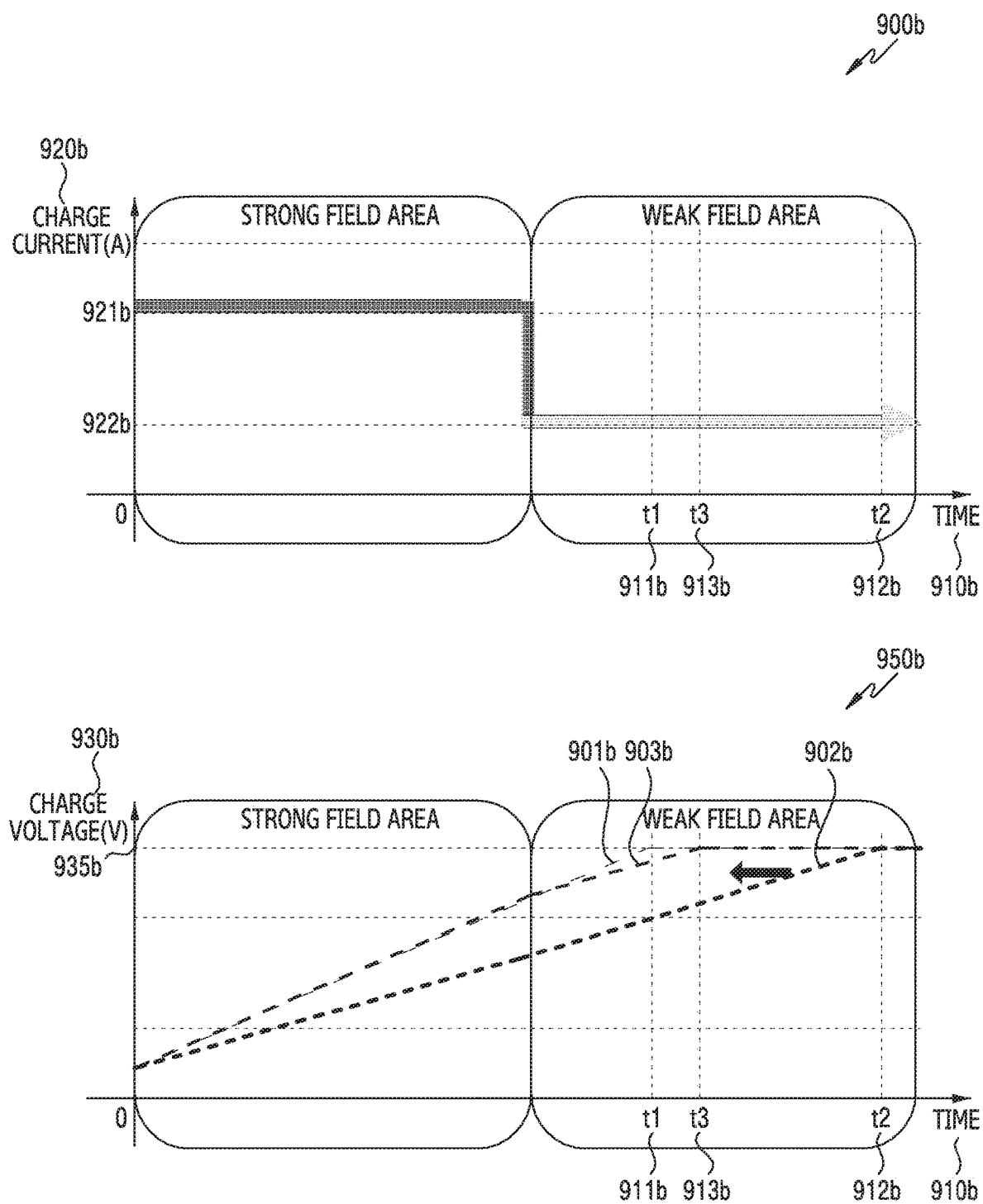
FIG. 9B illustrates a charge current control according to a field change according to an embodiment of the disclosure.

FIG. 9B illustrates a charge current control according to a field change according to an embodiment of the disclosure.

Referring to FIG. 9B, a situation where the electronic device 101 moves from a strong field area to a weak field area is described. The electronic device 101 may determine a charge current according to the field.

Referring to FIG. 9B, a graph 900b represents a charge current 920b according a charge time 910b. The horizontal axis of the graph 900b represents the charge time 910b, and the vertical axis of the graph 900b represents the charge current 920b. A graph 950b represents a charge voltage 930b according a charge time 910b. The horizontal axis of the graph 950b represents the charge time 910b, and the vertical axis of the graph 950b represents the charge voltage 930b. The electronic device 101 may be charged with a constant current until the charge voltage reaches a full charge voltage 935b of a battery of the electronic device 101.

The electronic device 101 may determine a first value 921b corresponding to the strong field area. The electronic device 101 may charge the electronic device 101 with a charge current having the first value. If there is no field change, the electronic device 101 may be charged according to the first charging state line 901b. The charging time of the electronic device 101 may be $t_1$ 911b.

The electronic device 101 may move from the strong field area to the weak field area. For example, the electronic device 101 may move from the cell center to the cell edge. In another example, it is a situation where an obstacle enters a communication path of the electronic device 101. The electronic device 101 may enter the weak field. The electronic device 101 may determine a second value 922b corresponding to the weak field. The electronic device 101 may charge the electronic device 101 with a charge current having the second value. The electronic device 101 may be charged according to the third charging state line 903b. The time of the electronic device 101 may be $t_2$ 912b and the charging time of the electronic device 101 may be $t_3$ 913b. The slope of the third charge state line 903b may be the same as the slope of the charge state line 902b corresponding to the second value. This is because that the charge voltage is proportional to the charge current in a constant current charging mode. Since the communication quality may be deteriorated due to the charge current in the weak field area, the electronic device 101 can guarantee the communication quality of a predetermined level or higher by setting the charge current small. The electronic device 101 may provide an effect of shortening the charging time by a time corresponding to '$t_4$-$t_2$' than when the charge current is always set lower. In addition, the electronic device 101 can provide an improvement in communication quality in the weak field.

Figure 9C:
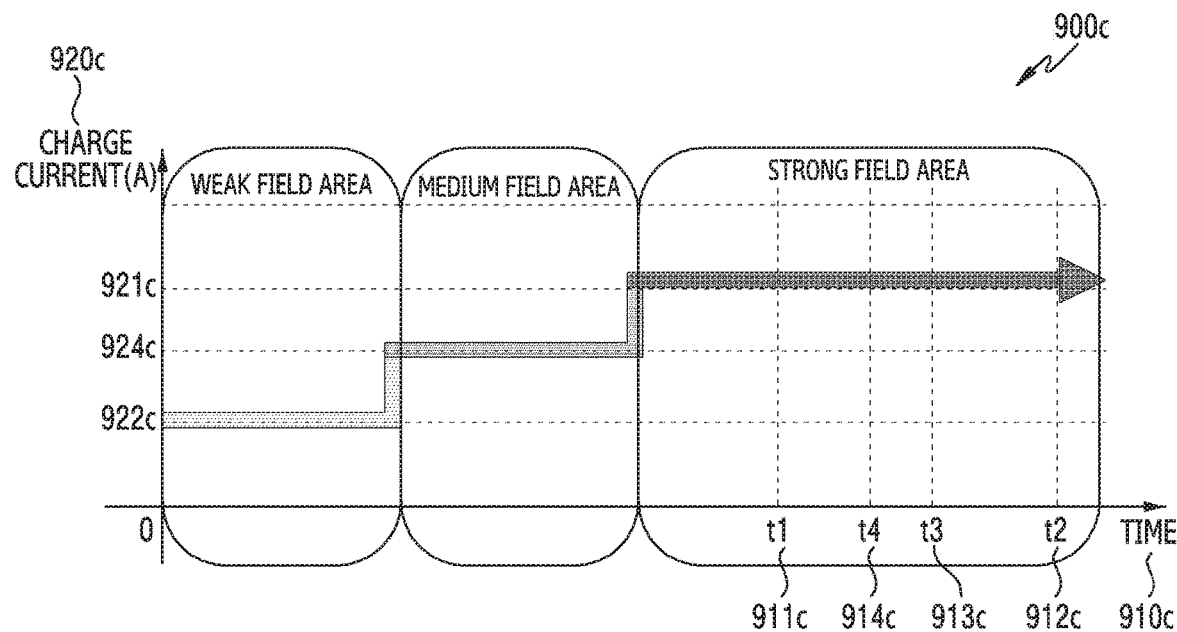
FIG. 9C illustrates a charge current control according to a field change according to an embodiment of the disclosure.
Figure 9C:
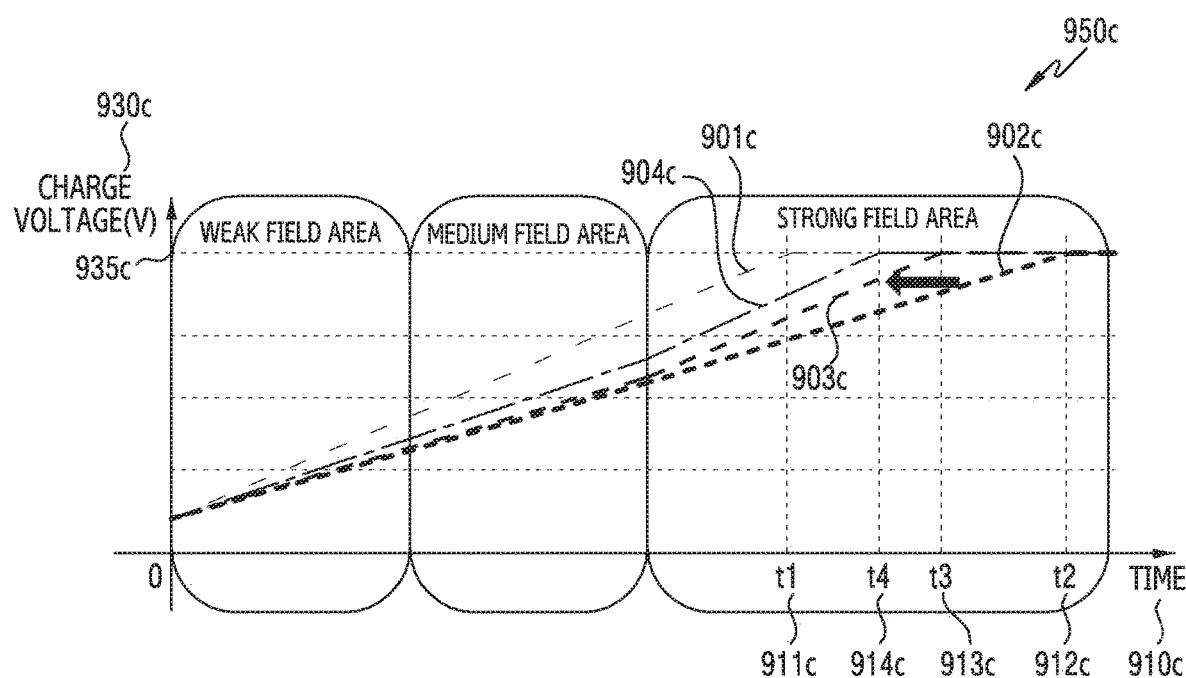

FIG. 9C illustrates a charge current control according to a field change according to an embodiment of the disclosure.

Referring to FIG. 9C, a situation where the electronic device 101 moves from a weak field area to a strong field area through a medium field area is described. The electronic device 101 may determine the charge current value according to a field.

Referring to FIG. 9C, a graph 900c represents a charge current 920c according a charge time 910c. The horizontal axis of the graph 900c represents the charge time 910c, and the vertical axis of the graph 900c represents the charge current 920c. A graph 950c represents a charge voltage 930b according a charge time 910c. The horizontal axis of the graph 950c represents the charge time 910c, and the vertical axis of the graph 950c represents the charge voltage 930c. The electronic device 101 may be charged with a constant current until the charge voltage reaches a full charge voltage 935c of a battery of the electronic device 101.

The electronic device 101 may move from the weak field area to the strong field area passing through the medium field area (or medium weak field area). The electronic device 101 may determine a second value 922c correspond to the weak field area. The electronic device 101 may start to charge the electronic device with a charge current having the second value 922c. If there is no change in field, the electronic device 101 may be charged along a second charge state line 902c. The time of the electronic device 101 may be $t_2$ 912c. The electronic device 101 may enter the medium field area. The electronic device 101 may determine a fourth value 924c corresponding to the medium field area. The electronic device 101 may resume charging the electronic device 101 with the charging current having the fourth value 924c. The electronic device 101 may charge the battery of the electronic device 101 with the charging current having the fourth value 924c. Thereafter, the electronic device 101 may enter the strong field area. The electronic device 101 may determine a first value 921c corresponding to the strong field area. The electronic device 101 may resume charging the electronic device 101 with the charge current having the first value 921c. The electronic device 101 may charge the battery of the electronic device 101 with the charge current having the first value 921c.

The electronic device 101 may be charged along a fourth charging state line 904c. The charging time of the electronic device 101 may be $t_4$ 914c. The slope of the fourth charging state line 904c may be the same as the slope of the second charging state line 902c in the weak field area and as the slope of the first charging state line 901c in the strong field area. The charging time of the electronic device 101 may be $t_1$ 911c. Since there is no deterioration in communication quality due to the charging current as the movement from the medium electric field area to the strong electric field area, the electronic device 101 can provide a shortening of charging time by increasing the charge current. If the electronic device 101 moves directly from the weak field area to the strong field area without the middle field area, the electronic device 101 may be charged according to the third charging state line 903c. The charging time of the electronic device 101 may be $t_3$ 913c. In contrast, the electronic device 101 may additionally define the middle field area and additionally operate the charge current as compared to the graph 900a of FIG. 9A, thereby providing a shortening of the charging time by the time according to '$t_3$-$t_4$'.

Figure 10:
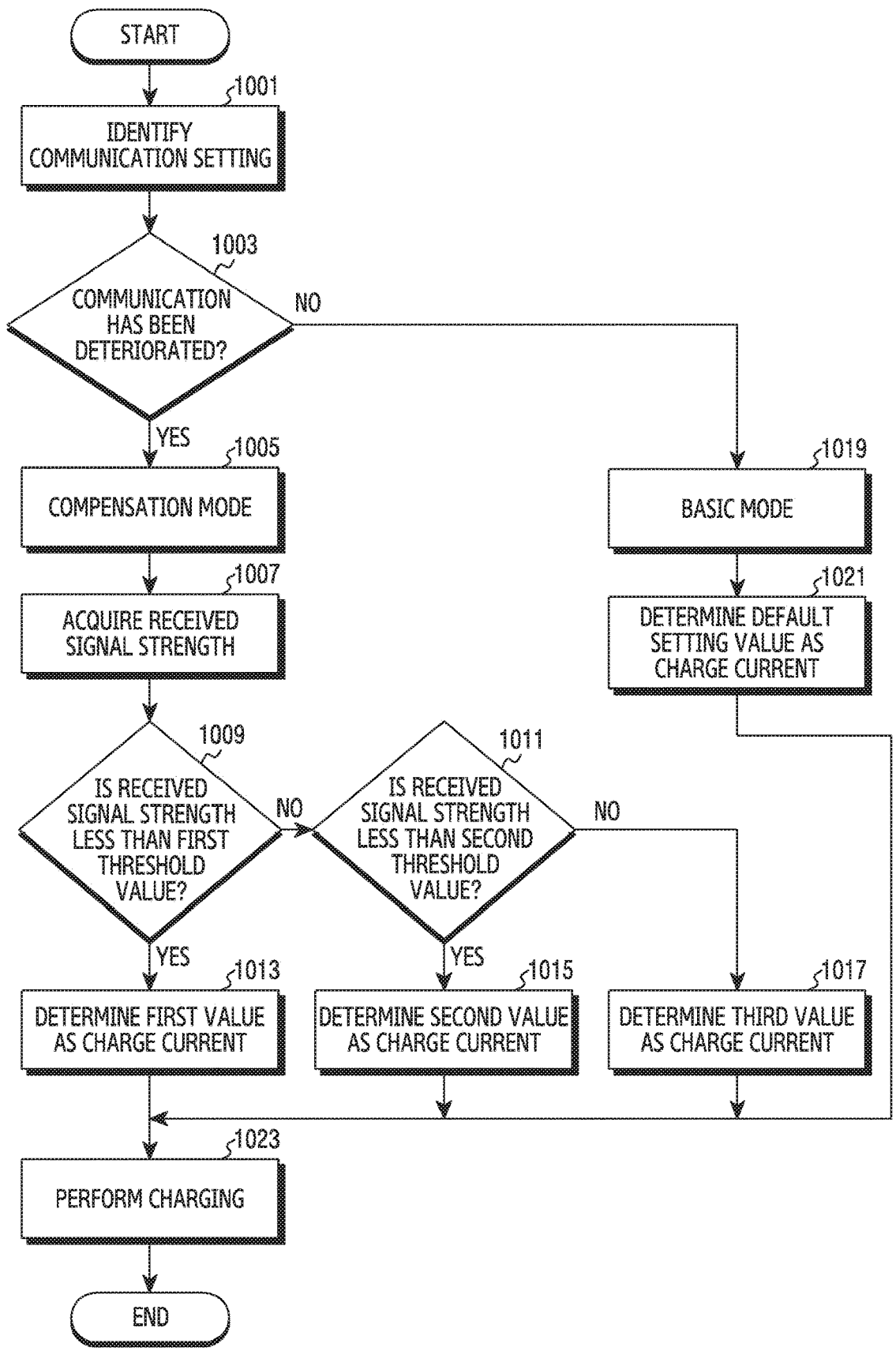
FIG. 10 illustrates an operation flow of an electronic device for determining a charge current according to a communication setting and a field according to an embodiment of the disclosure.

FIG. 10 illustrates an operation flow of an electronic device 101 for determining a charge current according to communication setting and field according to an embodiment of the disclosure. The operation of the electronic device 101 may be performed by a processor 480 of FIG. 4.

Referring to FIG. 10, in operation 1001, the electronic device 101 may identify a communication setting. The electronic device 101 may be in a communication connection state. The electronic device 101 may identify a communication setting related to the currently connected communication network. Operation 1001 corresponds to operation 501 of FIG. 5, and a description thereof may be omitted.

According to various embodiments, in operation 1003, the electronic device 101 may determine whether a communication setting causes deterioration in communication performance. In some embodiments, the electronic device 101 may determine whether the communication setting causes degradation of communication performance by determining whether the communication setting belongs to a predefined group. The group may include at least one communication setting in which the charge current is determined to affect communication quality according to the communication setting. Further, in some embodiments, the electronic device 101 may measure the communication quality and determine whether the measured communication quality exceeds a threshold value according to the communication setting, thereby determining whether the communication setting causes deterioration of the communication performance. Operation 1003 corresponds to operation 503 of FIG. 5, and the description of operation 503 may be equally applied to operation 1003 of the electronic device 101.

According to various embodiments, in operation 1005, the electronic device 101 may operate in a compensation mode. The compensation mode may be defined as a mode requiring compensation for communication performance deterioration by controlling the charge current. The compensation mode may be referred to as a charging noise mode. The electronic device 101 may operate in the compensation mode to determine a value of a charge current for compensating for deterioration in communication performance. The electronic device 101 may determine the value of the charge current value via operations 1007 to 1017.

According to various embodiments, in operation 1007, the electronic device 101 may obtain a received signal strength. The electronic device 101 may measure the received signal strength. For example, the electronic device 101 may measure the RSRP of the CRS transmitted from a base station. In some embodiments, the electronic device 101 may obtain a value of the received signal strength measured when determining whether the communication setting causes performance deterioration. The electronic device 101 may compare threshold values according to the received signal strength and communication setting, and may operate in the compensation mode when the received signal strength is less than the threshold value. The electronic device 101 may obtain the received signal strength used for the comparison.

According to various embodiments, in operation 1009, the electronic device 101 may determine whether the received signal strength is less than a first threshold value. The electronic device 101 may determine whether the electronic device 101 is located in a weak field area. According to an embodiment of the disclosure, the first threshold value may be determined based on the communication setting identified in operation 1001. Operation 1009 corresponds to operation 805 of FIG. 8, and the description of operation 807 may be equally applied to operation 1009 of the electronic device 101.

According to various embodiments, in operation 1011, the electronic device 101 may determine whether the received signal strength is less than a second threshold value. The electronic device 101 may determine whether the electronic device 101 is located in a medium field area or a strong field area. According to an embodiment of the disclosure, the second threshold may be determined based on the communication setting identified in operation 1001. Operation 1011 corresponds to operation 807 of FIG. 8, and the description of operation 807 may be equally applied to operation 1011 of the electronic device 101.

According to various embodiments, in operation 1013, the electronic device 101 may determine a first value as the charge current. The electronic device 101 may determine the first value corresponding to the weak field as the charge current. According to an embodiment of the disclosure, the first value may be determined based on the communication setting identified in operation 1001. Operation 1013 corresponds to operation 809 of FIG. 8, and the description of operation 809 may be equally applied to operation 1013 of the electronic device 101.

According to various embodiments, in operation 1015, the electronic device 101 may determine the second value as the charge current. The electronic device 101 may determine the second value corresponding to the medium field as the charge current. According to an embodiment of the disclosure, the second value may be determined based on the communication setting identified in operation 1001. Since operation 1015 corresponds to operation 811 of FIG. 8, the description of operation 811 may be equally applied to operation 1015 of the electronic device 101.

According to various embodiments of the disclosure, in operation 1017, the electronic device 101 may determine a third value as the charge current. The electronic device 101 may determine the third value corresponding to a strong field as the charge current. According to an embodiment of the disclosure, the third value may be determined based on the communication setting identified in operation 1001. Since operation 1017 corresponds to operation 813 of FIG. 8, the description of operation 813 may be equally applied to operation 1017 of the electronic device 101.

According to various embodiments, in operation 1019, the electronic device 101 may operate in a basic mode. The basic mode may refer to a mode in which the existing charge current is maintained as a change in the charge current is not necessary since the communication quality according to the current communication setting is not affected by the charge current. This communication setting may be referred to as a charging noiseless mode. In operation 1021, the electronic device 101 may determine a default setting value as the charge current. The electronic device 101 may operate in the basic mode to determine the default setting value as the charge current. The default setting value may be a maximum charge current settable by the electronic device 101.

According to various embodiments, in operation 1023, the electronic device 101 may perform charging. The electronic device 101 may perform wired charging or wireless charging. The electronic device 101 may set a field suitable for communication setting, and thereby determine the charge current, so that the electronic device 101 can provide a high charge current in a situation where charging deterioration does not occur. The electronic device 101 may provide an improvement in communication performance and a reduction in charging time that are more optimized for the current communication setting by utilizing the charge current according to the field together with the communication setting. Operation 1023 corresponds to operation 509 of FIG. 5, and a description of operation 509 may be equally applied to operation 1023 of the electronic device 101.

According to various embodiments, a method for operating an electronic device may include an operation of detecting a charging event for a battery of the electronic device, an operation of determining a difference value between first communication quality before detection of the charging event and second communication quality after detection of the charging event, an operation of determining a charge current value, based on the difference value, and an operation of charging the battery according to the determined charge current value.

According to various embodiments, the determining of the charge current value may include determining a first value as the charge current value when the difference value exceeds a threshold value, and determining a second value as the charge current when the difference value is less than or equal to the threshold value, wherein the first value may be smaller than the second value.

According to various embodiments, the second value may be a maximum charge current value that can be applied to the battery.

According to various embodiments, the determining of the charge current may include determining the charge current value, based on the second communication quality when the difference value exceeds a threshold value, and determining the default setting value currently being charged to the battery as the charge current value when the difference value is less than or equal to the threshold value.

According to various embodiments, the determining of the charge current value, based on the second communication quality may include determining a first value as the charge current value when the second communication quality is less than a first threshold value, and determining a second value as the charge current value when the second communication quality is equal to or greater than the first threshold value, wherein the first value may be smaller than the second value.

According to various embodiments, the determining of the charge current value, based on the second communication quality may include determining a first value as the charge current value when the second communication quality is less than a first threshold value and, determining a second value as the charge current value when the second communication quality is greater than or equal to the first threshold value and less than the second threshold value, and determining a third value as the charge current value wherein the second communication quality is greater than or equal to the second threshold value, wherein the first value is smaller than the second value and the second value is smaller than the third value.

According to various embodiments, the operation method may further include identifying a communication setting associated with a wireless link formed by the electronic device, and determining the threshold value, based on the identified communication setting.

According to various embodiments, the determining of the charge current value may include identifying a communication setting related to a wireless link formed by the electronic device, and determining the charge current value, based on the difference value when the identified communication setting belongs to a first group, and the operation method may further include determining a maximum charge current as the charge current when the identified communication setting belongs to a second group.

According to various embodiments, the communication setting may include at least one of a communication scheme, a communication mode, or a communication channel, and the communication scheme may refer to a radio access technology with which the electronic device is communicating, the communication mode may refer to a frequency band according to the communication scheme, and the communication channel may refer to a type of a wireless channel according to the communication scheme.

According to various embodiments, the determining of the difference value may include determining the first communication quality by measuring the strength of a first signal received from a base station, and determining the second communication quality by measuring the strength of a second signal received from the base station.

According to various embodiments, a method for operating an electronic device may include determining a range of received signal strength of each of a plurality of fields by measuring a degree to which communication quality decreases with the change in the strength of the received signal, determining a first received signal strength value during the battery is being charged, identifying a field corresponding to the first received signal strength value among the plurality of electric fields, identifying a charge current value corresponding to the identified field among a plurality of charge current values, and charging the battery according to the identified charge current value, wherein the plurality of fields may corresponding to the plurality of charge current values, respectively.

The operations of the electronic device 101 according to the combination of the charge current control according to the communication setting of FIG. 5 and the charge current control according to the field of FIG. 8 are described via FIG. 10. The electronic device 101 of the disclosure may combine the charge current control scheme in another manner in addition to the operations of FIG. 10. In some embodiments, a combination of charge current control according to the quality change of FIG. 7 and charge current control according to the field of FIG. 8 may be considered. The electronic device 101 may measure the received signal strength before and after the charging event. When the amount of change in the received signal strength exceeds a threshold value, the electronic device 101 may determine that there is deterioration in communication performance due to charging. When the amount of change in the received signal strength exceeds the threshold value, the electronic device 101 may perform the charge current control by determining a charge current value according to the field of the current received signal strength. The current received signal strength may be the received signal strength measured after the charging event occurs. In addition, in some embodiments, the communication setting of FIG. 5, the quality change of FIG. 7, and the charge current control according to the field of FIG. 8 may be considered. The electronic device 101 may primarily classify the communication deterioration via the communication setting, and secondly determine whether the deterioration is a degradation of the reception quality due to the charge current via the quality change. When it is determined as a degradation of the reception quality due to the charge current, the electronic device 101 may determine the charge current value according to the field.

By further considering changes in communication quality in various embodiments, more sophisticated charge current control can be achieved. By not only controlling the charge current supplied to the battery by merely looking at the deterioration of the communication quality, but also determining whether the deterioration of the communication quality is due to charging, the electronic device 101 can more accurately identify the influence due to the charge current. The electronic device 101 can prevent unnecessary lowering of the charge current by considering only the influence due to the charge current. Even if the communication quality is lowered, the electronic device 101 can provide a shortening of the charging time by using a higher charge current when the communication performance is not deteriorated due to the charge current.

According to various embodiments, instead of simply reducing the charge current, the electronic device 101 may adaptively configure the charge current in consideration of by comprehensively considering a communication mode (e.g., 802.11b, 802.11n, 802.11ax, etc.) of the electronic device 101, a communication scheme (e.g., 2G, 3G, 4G, GPS, Wi-Fi, NFC, etc.), communication channel (e.g., LTE B3, LTE B5, 802.11a, 44ch/161ch), field (e.g., strong field, medium field, weak field), quality variation). The electronic device according to various embodiments may provide optimization of a tradeoff between a reduction in charging time and an improvement in communication performance by adaptively determining a charging current. The disclosure has been described as controlling the charging current via a command of a registry of software, but the disclosure is not limited thereto. The electronic device 101 may increase the charge current while lowering the value of the variable impedance of the resistance of the charging circuit or lower the charging current while increasing the value of the variable impedance. In addition, in the case of wireless charging, the electronic device 101 may increase the charge current while increasing the variable capacitance value of the coil that transmits power, or reduce the charge current while lowering the capacitance value of the coil.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

In the disclosure, the expression of 'greater than or equal to' or 'less than or equal to' is used to determine whether a certain condition is fulfilled. However, this is merely a description for expressing an example and does not exclude the above or below description. The conditions described as 'greater than or equal to' may be replaced with 'exceed', those described as 'less than or equal to' may be replaced with 'less than', and those described as 'greater than or equal to or less than' may be replaced with 'exceed or less than'.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks, such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a battery;
    at least one transceiver; and
    at least one processor configured to be operatively coupled with the at least one transceiver,
    wherein the at least one processor is configured to:
        detect a charging event for the battery,
        determine a difference value between a first communication quality before detection of the charging event and a second communication quality after detection of the charging event,
        determine a charge current value, based on the difference value, and
        charge the battery according to the determined charge current value.

2. The electronic device of claim 1, wherein, in order to determine the charge current value, the at least one processor is further configured to:
    determine a first value as the charge current value, if the difference value exceeds a threshold value, and
    determine a second value as the charge current value, if the difference value is less than or equal to the threshold value,
    wherein the second value includes a maximum charge current value that can be applied to the battery, and
    wherein the first value is less than the second value.

3. The electronic device of claim 2, wherein, in order to determine the charge current value, the at least one processor is further configured to:
    determine the charge current value, based on the second communication quality if the difference value exceeds the threshold value, and
    determine a default setting value currently being charged in the battery as the charge current value, if the difference value is less than or equal to the threshold value.

4. The electronic device of claim 3, wherein, in order to determine the charge current value, based on the second communication quality, the at least one processor is further configured to:
    determine the first value as the charge current value, if the second communication quality is less than a first threshold value, and
    determine the second value as the charge current value, if the second communication quality is greater than or equal to the first threshold value,
    wherein the first value is less than the second value.

5. The electronic device of claim 4, wherein, in order to determine the charge current value, based on the second communication quality, the at least one processor is further configured to:
    determine the first value as the charge current value, if the second communication quality is less than the first threshold value,
    determine the second value as the charge current value, if the second communication quality is greater than or equal to the first threshold value and is less than a second threshold value, and
    determine a third value as the charge current value, if the second communication quality is greater than or equal to the second threshold value,
    wherein the first value is less than the second value, and the second value is less than the third value.

6. The electronic device of claim 3, wherein the at least one processor is further configured to:
    identify a communication setting related to a wireless link formed by the electronic device, and
    determine the threshold value, based on the identified communication setting.

7. The electronic device of claim 1, wherein, in order to determine the charge current value, the at least one processor is further configured to:
    identify a communication setting related to a wireless link formed by the electronic device,
    determine the charge current value, based on the difference value, if the identified communication setting belongs to a first group, and
    determine a maximum charge current value as the charge current value, if the identified communication setting belongs to a second group.

8. The electronic device of claim 7,
    wherein the communication setting comprises at least one of a communication scheme, a communication mode, or a communication channel,
    wherein the communication scheme includes a radio access technology with which the electronic device is communicating,
    wherein the communication mode includes a frequency band according to the communication scheme, and
    wherein the communication channel includes a type of a radio channel according to the communication scheme.

9. The electronic device of claim 1, wherein, in order to determine the difference value, the at least one processor is further configured to:

determine the first communication quality by measuring a strength of a first signal received from a base station, and determine the second communication quality by measuring a strength of a second signal received from the base station.

10. An electronic device comprising:

a battery;

at least one transceiver; and at least one processor configured to be operatively coupled with the at least one transceiver, wherein the at least one processor is configured to:

determine a range of a received signal strength of each of a plurality of fields by measuring a degree to which a communication quality decreases depending on a change in the received signal strength, determine a first received signal strength value while the battery is charged, identify a field corresponding to the first received signal strength value among the plurality of fields, identify a charge current value corresponding to the identified field from a plurality of charge current values, and charge the battery according to the identified charge current value, wherein each of the plurality of fields corresponds to each of the plurality of charge current values.

11. A method for operating an electronic device, the method comprising:

detecting a charging event for a battery of the electronic device;

determining a difference value between a first communication quality before detection of the charging event and a second communication quality after detection of the charging event;

determining a charge current value, based on the difference value; and charging the battery according to the determined charge current value.

12. The method of claim 11, wherein the determining of the charge current value comprises:

determining a first value as the charge current value, if the difference value exceeds a threshold value; and determining a second value as the charge current value, if the difference value is less than or equal to the threshold value, wherein the second value includes a maximum charge current value that can be applied to the battery, and wherein the first value is less than the second value.

13. The method of claim 12, wherein the determining of the charge current value comprises:

determining the charge current value, based on the second communication quality if the difference value exceeds the threshold value; and determining a default setting value currently being charged to the battery as the charge current value, if the difference value is less than or equal to the threshold value.

14. The method of claim 13, wherein the determining of the charge current value, based on the second communication quality, comprises:

determining the first value as the charge current value, if the second communication quality is less than a first threshold value, and determining the second value as the charge current value, if the second communication quality is greater than or equal to the first threshold value, wherein the first value is less than the second value.

15. The method of claim 14, wherein the determining of the charge current value, based on the second communication quality, comprises:

determining the first value as the charge current value, if the second communication quality is less than the first threshold value, determining the second value as the charge current value, if the second communication quality is greater than or equal to the first threshold value and is less than a second threshold value, and determining a third value as the charge current value, if the second communication quality is greater than or equal to the second threshold value, wherein the first value is less than the second value, and the second value is less than the third value.

16. The method of claim 13, further comprising:

identifying a communication setting related to a wireless link formed by the electronic device, and determining the threshold value, based on the identified communication setting.

17. The method of claim 11, wherein the determining of the charge current value comprises:

identifying a communication setting related to a wireless link formed by the electronic device, and determining the charge current value, based on the difference value if the identified communication setting belongs to a first group, wherein the method for operating further comprises determining a maximum charge current value as the charge current value if the identified communication setting belongs to a second group.

18. The method of claim 17, wherein the communication setting comprises at least one of a communication scheme, a communication mode, or a communication channel, wherein the communication scheme includes a radio access technology with which the electronic device is communicating, wherein the communication mode includes a frequency band according to the communication scheme, and wherein the communication channel includes a type of a radio channel according to the communication scheme.

19. The method of claim 11, wherein the determining of the difference value comprises:

determining the first communication quality by measuring a strength of a first signal received from a base station; and determining the second communication quality by measuring a strength of a second signal received from the base station.

* * * * *